(12) United States Patent
Zhang et al.

(10) Patent No.: US 9,438,926 B2
(45) Date of Patent: Sep. 6, 2016

(54) CONSTRAINTS ON NEIGHBORING BLOCK BASED DISPARITY VECTOR (NBDV) TECHNIQUES FOR 3D VIDEO

(71) Applicant: QUALCOMM Incorporated, San Diego, CA (US)

(72) Inventors: Li Zhang, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 14/133,951

(22) Filed: Dec. 19, 2013

(65) Prior Publication Data

US 2014/0177720 A1    Jun. 26, 2014

Related U.S. Application Data

(60) Provisional application No. 61/745,450, filed on Dec. 21, 2012.

(51) Int. Cl.
*H04N 11/02*    (2006.01)
*H04N 19/52*    (2014.01)
*H04N 19/597*   (2014.01)

(52) U.S. Cl.
CPC ............ *H04N 19/52* (2014.11); *H04N 19/597* (2014.11)

(58) Field of Classification Search
USPC .................................................... 375/240.16
See application file for complete search history.

(56) References Cited

U.S. PATENT DOCUMENTS

| | | |
|---|---|---|
| 2012/0224634 A1 | 9/2012 | Yamori |
| 2012/0257678 A1 | 10/2012 | Zhou et al. |
| 2012/0263231 A1 | 10/2012 | Zhou |
| 2012/0320984 A1 | 12/2012 | Zhou |

FOREIGN PATENT DOCUMENTS

WO    2012171442 A1    12/2012

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

(Continued)

*Primary Examiner* — Leron Beck
(74) *Attorney, Agent, or Firm* — Shumaker & Sieffert, P.A.

(57) ABSTRACT

Techniques are described for determining whether a block in a candidate reference picture is available. A video coder may determine a location of a co-located largest coding unit (CLCU) in the candidate reference picture, where the CLCU is co-located with a LCU in a current picture, and the LCU includes a current block that is to be inter-predicted. The video coder may determine whether a block in the candidate reference picture is available based on a location of the block in the candidate reference picture relative to the location of the CLCU. If the block in the candidate reference picture is unavailable, the video coder may derive a disparity vector for the current block from a block other than the block determined to be unavailable.

27 Claims, 8 Drawing Sheets

(56) References Cited

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen et al., "3D-CE5.h related: Unified temporal collocated picture for DV derivation," MPEG Meeting; Shanghai, (Motion Picture Expert Group or ISO/IEC JTC1/SC291WG11), JCT3V-B0088, Oct. 13-19, 2012, 6 pp.

International Search Report and Written Opinion—PCT/US2013/076972—ISA/EPO—Jun. 2, 2014, 12 pp.

ITU-T H.264, Series H: Audiovisual and Multimedia Systems, Infrastructure of audiovisual services—Coding of moving video, Advanced video coding for generic audiovisual services, The International Telecommunication Union. Mar. 2010, 674 pp.

Sung et al., "3D-CE5.h: Simplification of disparity vector derivation for HEVC-based 3D video coding," The Joint Collaborative Team on 3D Video Coding Extension Development of ISO/IECJTC1/SC29/WG11 and ITU-T SG.16; URL: http://phenix.int-evry.fr/JCT21 No. JCT2-A0126, Jul. 16-20, 2012, 4 pp.

Tech et al., "3D-HEVC Test Model 1," JCT-3V Meeting; MPEG Meeting; Stockholm; (The Joint Collaborative Team on 3D Video Coding Extension Development of ISO/IEC JTC1/SC29/WG11 and ITU-T SG.16 ); URL: http://phenix.int-evry.fr/jct2/ No. JCT3V-A1005_d0, Jul. 16-20, 2012, 83 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

Zhang et al., "3D-CE5.h related: Disparity vector derivation for multiview video and 3DV," MPEG Meeting; Geneva; (Motion Picture Expert Group or ISO/IEC JTC1/SC29/WG11) No. m24937, Apr.-May 2012, 6 pp.

ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

ITU-T H.264, Series H: Audiovisual and Multimedia Systems, Infrastructure of audiovisual services—Coding of moving video, Advanced video coding for generic audiovisual serviced, The International Telecommunication Union, Jun. 2011, 674 pp.

Bross et al., "High efficiency video coding (HEVC) text specification draft 9," 11th Meeting: Shanghai, CN, Oct. 10-19, 2012, JCTVC-K1003_v13, 317 pp.

Tech et al., "3D-HEVC Test Model 2," Joint Collaborative Team on 3D Video Coding Extension Development of ITU-T SG 16 WP 3 and ISO/IEC JTC 1/SC 29/WG 11, JCT3V-B1005_d0, Oct. 13-19, 2012, 118 pp.

Bross et al., "Editors' proposed corrections to HEVC version 1," Joint Collaborative Team on Video Coding (JCT-VC) of ITU-T SG 16 WP 3 and ISO/IEC JTC 1/SC 29/WG 11, JCTVC-M0432_v3, Apr. 18-26, 2013, 310 pp.

International Preliminary Report on Patentability from International Application No. PCT/US2013/076972, mailed Mar. 27, 2015, 9 pp.

Second Written Opinion of International Application No. PCT/US2013/076972, mailed Feb. 16, 2015, 7 pp.

Taiwan Search Report—TW102147651—TIPO—Dec. 19, 2015 (1 page).

CONSTRAINTS ON NEIGHBORING BLOCK BASED DISPARITY VECTOR (NBDV) TECHNIQUES FOR 3D VIDEO

This application claims the benefit of U.S. Provisional Application 61/745,450 filed 21 Dec. 2012, the entire content of which is incorporated by reference herein.

TECHNICAL FIELD

This disclosure relates to video coding and, more particularly, to techniques for coding multiview and three-dimensional (3D) video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently being finalized, and extensions of such standards. The video devices may transmit, receive, encode, decode, and/or store digital video information more efficiently by implementing such video compression techniques.

Video compression techniques perform spatial (intra picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

A multi-view coding bitstream may be generated by encoding views, e.g., from multiple perspectives. Some three-dimensional (3D) video standards have been developed that make use of multi-view coding aspects. For example, different views may transmit left and right eye views to support 3D video. Alternatively, some 3D video coding processes may apply so-called multi-view plus depth coding. In multi-view plus depth coding, a 3D video bitstream may contain not only texture view components, but also depth view components. For example, each view may comprise one texture view component and one depth view component.

SUMMARY

This disclosure describes techniques related to multiview video coding, and more particularly, this disclosure describes techniques in which a video coder (e.g., video encoder or video decoder) determines a disparity vector for a current block within a current picture of a current view. The video coder, in some examples, may determine the disparity vector for the current block based on a disparity motion vector of another block, including a block in a different picture than the picture that includes the current block.

One or more of the example techniques described in this disclosure are directed to determining whether a block is available for purposes of determining the disparity vector of the current block. For example, the techniques may determine a location of a co-located largest coding unit (CLCU) in a picture other than the current picture. The techniques may determine whether a block, in the picture other than the current picture, is available based on the location of the block, in the picture other than the current picture, relative to the location of the CLCU.

In one example, the disclosure describes a method for decoding video data. The method includes determining a location of a co-located largest coding unit (CLCU) in a candidate reference picture. The CLCU is co-located with a largest coding unit (LCU) that covers a current block in a current picture of the video data. The method also includes determining whether a block in the candidate reference picture is available based on a location of the block in the candidate reference picture relative to a location of the CLCU within the candidate reference picture. In the method, if the block in the candidate reference picture is available, determining whether the block in the candidate reference picture is inter-predicted with a disparity motion vector. The disparity motion vector refers to a reference picture used to inter-predict the block in the candidate reference picture and is in a view other than a view that includes the candidate reference picture. In the method, if the block in the candidate reference picture is inter-predicted with the disparity motion vector, deriving a disparity vector for the current block from the disparity motion vector. The method further includes inter-prediction decoding the current block based in part on the disparity vector.

In one example, the disclosure describes a method for encoding video data. The method includes determining a location of a co-located largest coding unit (CLCU) in a candidate reference picture. The CLCU is co-located with a largest coding unit (LCU) that covers a current block in a current picture of the video data. The method also includes determining whether a block in the candidate reference picture is available based on a location of the block in the candidate reference picture relative to a location of the CLCU within the candidate reference picture. In the method, if the block in the candidate reference picture is available, determining whether the block in the candidate reference picture is inter-predicted with a disparity motion vector. The disparity motion vector refers to a reference picture used to inter-predict the block in the candidate reference picture and is in a view other than a view that includes the candidate reference picture. In the method, if the block in the candidate reference picture is inter-predicted with the disparity motion vector, deriving a disparity vector for the current block from the disparity motion vector. The method further includes inter-prediction encoding the current block based in part on the disparity vector.

In one example, the disclosure describes a device that includes a video coder. The video coder is configured to determine a location of a co-located largest coding unit (CLCU) in a candidate reference picture. The CLCU is co-located with a largest coding unit (LCU) that covers a current block in a current picture. The video coder is also configured to determine whether a block in the candidate reference picture is available based on a location of the block in the candidate reference picture relative to a location of the CLCU within the candidate reference picture. If the block in the candidate reference picture is available, the video coder is configured to determine whether the block in the candidate reference picture is inter-predicted with a disparity motion vector. The disparity motion vector refers to a reference picture used to inter-predict the block in the candidate reference picture and is in a view other than a view that includes the candidate reference picture. If the block in the candidate reference picture is inter-predicted with the disparity motion vector, the video coder is configured to derive a disparity vector for the current block from the disparity motion vector. The video coder is also configured to inter-prediction code the current block based in part on the disparity vector.

In one example, the disclosure describes a device for coding video data. The device includes means for determining a location of a co-located largest coding unit (CLCU) in a candidate reference picture. The CLCU is co-located with a largest coding unit (LCU) that covers a current block in a current picture of the video data. The device also includes means for determining whether a block in the candidate reference picture is available based on a location of the block in the candidate reference picture relative to a location of the CLCU within the candidate reference picture. The device includes means for determining whether the block in the candidate reference picture is inter-predicted with a disparity motion vector if the block in the candidate reference picture is available. The disparity motion vector refers to a reference picture used to inter-predict the block in the candidate reference picture and is in a view other than a view that includes the candidate reference picture. The device includes means for deriving a disparity vector for the current block from the disparity motion vector if the block in the candidate reference picture is inter-predicted with the disparity motion vector, and means for inter-prediction coding the current block based in part on the disparity vector.

In one example, the disclosure describes a computer-readable storage medium having instructions stored thereon that when executed by one or more processors of a device for coding video data cause the one or more processors to determine a location of a co-located largest coding unit (CLCU) in a candidate reference picture. The CLCU is co-located with a largest coding unit (LCU) that covers a current block in a current picture of the video data. The instructions also cause the one or more processors to determine whether a block in the candidate reference picture is available based on a location of the block in the candidate reference picture relative to a location of the CLCU within the candidate reference picture. The instructions also cause the one or more processors to determine whether the block in the candidate reference picture is inter-predicted with a disparity motion vector if the block in the candidate reference picture is available. The disparity motion vector refers to a reference picture used to inter-predict the block in the candidate reference picture and is in a view other than a view that includes the candidate reference picture. The instructions further cause the one or more processors to derive a disparity vector for the current block from the disparity motion vector if the block in the candidate reference picture is inter-predicted with the disparity motion vector, and inter-prediction code the current block based in part on the disparity vector.

The details of one or more examples are set forth in the accompanying drawings and the description below. Other features, objects, and advantages will be apparent from the description and drawings, and from the claims.

DETAILED DESCRIPTION

Figure 1:
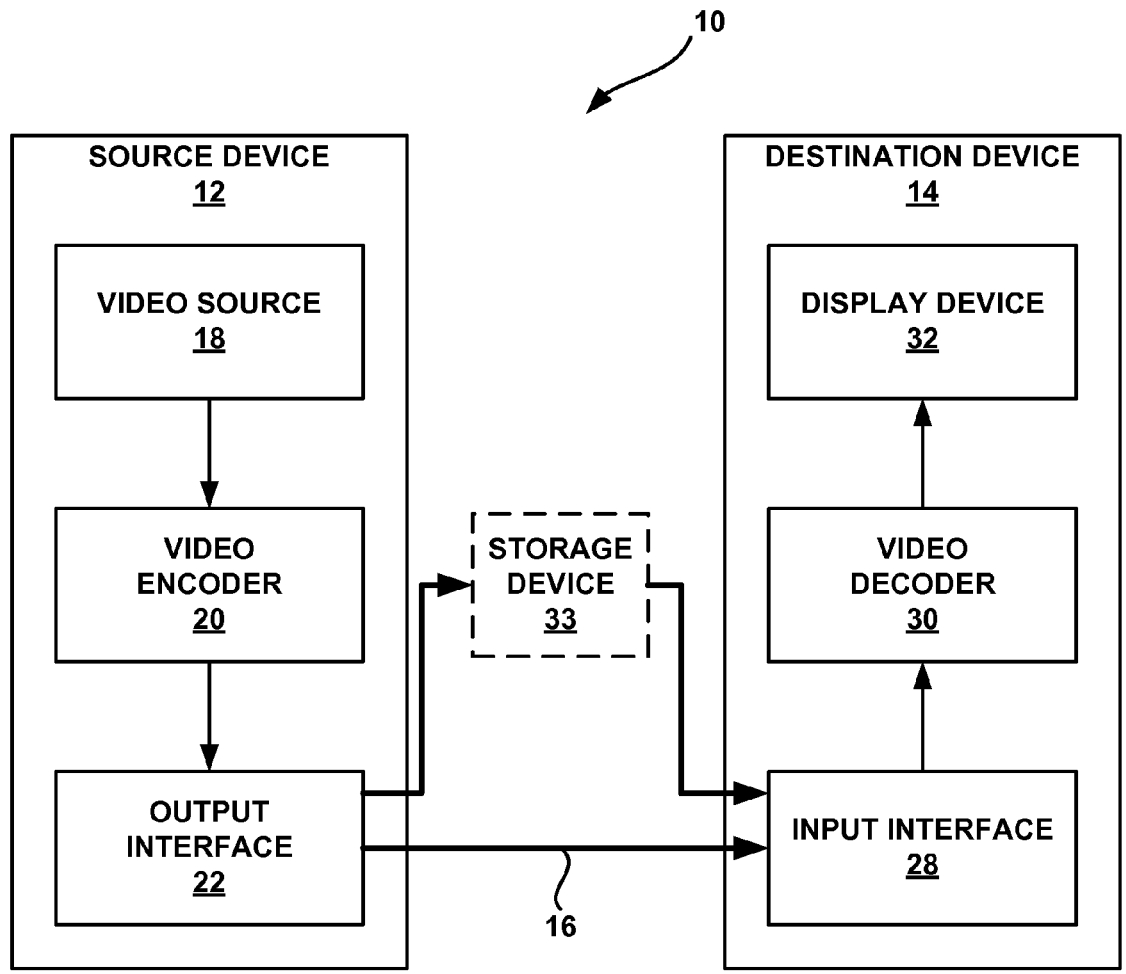
FIG. 1 is a block diagram illustrating an example video encoding and decoding system that may utilize the techniques described in this disclosure.

One or more examples techniques described in this disclosure are related to disparity vector derivation, and generally provide for a low-complexity disparity vector derivation scheme that may be utilized in various video coding standards. However, the techniques should not be considered limited video coding standards, and may be applicable to non-standards based video coding.

In multi-view video, there are multiple views that each include a plurality of pictures. The pictures of each view that represent the same time instance of video include similar video content. However, the video content of views may be displaced spatially relative to one another. In particular, the video content of the views may represent different perspectives. For example, a video block in a picture in a first view may include video content that is similar to a video block in a picture in a second view. In this example, the location of the video block in the picture in the first view and the location of the video block in the picture in the second view may be different. For example, there may be some displacement between the locations of the video blocks in the different views.

For example, there may be horizontal disparity between blocks within the pictures. For instance, a block in a first picture of a first view may be horizontally displaced relative to the location of a block in a first picture of a second view. In some examples, there may be both horizontal and vertical disparities between blocks within the pictures.

Each of the blocks in the pictures may be associated with a disparity vector. The disparity vector provides a measure of the displacement of a block relative to a picture in another view. In the previous example, a disparity vector of the block in the first picture of the second view may provide a measure of where the block in the first picture of the first view is located. In other words, the disparity vector of the block in the first picture of the second view may be considered as referring to the block in the first picture of the first view.

A video encoder and a video decoder may utilize the disparity vector of a block for various purposes. As one example, the video encoder and the video decoder may utilize the motion information of the block, to which the disparity vector for the current block refers, to determine the motion information for the current block. As another example, the disparity vector can be used for residual prediction. As yet another example, the disparity vector can be used to derive a picture of another view.

There may various techniques for determining the disparity vector of a current block. Some techniques have been proposed for utilizing the vector of a neighboring block to derive the disparity vector of the current block, in a neighboring block based disparity vector (NBDV) derivation technique. For example, the video encoder and the video decoder may determine whether a block that neighbors the current block is inter-predicted with a disparity motion vector. A disparity motion vector of a block is a vector that refers to a predictor block in a picture in a view other than the view that includes the block. The disparity motion vector and the disparity vector should not be confused. The disparity motion vector of a block refers to a predictor block whose pixel values are used to determine a residual with the pixel values of the block for purposes of inter-prediction. The disparity vector is utilized for the examples described above. In some cases, it is possible for the disparity motion vector and the disparity vector to be the same; however, this is not a requirement.

The video encoder and the video decoder may be configured to determine whether a neighboring block to the current block is inter-predicted with a disparity motion vector. If the neighboring block to the current block is inter-predicted with the disparity motion vector, the video encoder and the video decoder may derive the disparity vector of the current block based on the disparity motion vector (e.g., set the disparity vector of the current block equal to the disparity motion vector). There may be two types of neighboring blocks: spatial neighboring blocks and temporal neighboring block. A disparity vector that is derived from the disparity motion vector for a spatial neighboring block is referred to as a spatial disparity vector (SDV). A disparity vector that is derived from the disparity motion vector for a temporal neighboring block is referred to as a temporal disparity vector (TDV).

In some examples, in addition to determining whether a neighboring block is inter-predicted with a disparity motion vector, the video encoder and the video decoder may determine whether a disparity vector was derived for a neighboring block. If a disparity vector was derived for the neighboring block, the video encoder and the video decoder may derive the disparity vector for the current block from the derived disparity vector of the neighboring block. The disparity vector for the current block that was derived from a disparity vector of the neighboring block is referred to as an implicit disparity vector (IDV).

Example techniques described in this disclosure include determining whether a block is available for purposes of determining the disparity vector of the current block. In particular, the techniques include examples of determining whether a block in a picture other than the picture that includes the current block is available for purposes of determining the disparity vector of the current block. If the block is available and the block is inter-predicted with a disparity motion vector, the video encoder and the video decoder may derive the disparity vector from the disparity motion vector. If the block is unavailable, the video encoder and the video decoder may derive the disparity vector for the current block without accessing the block.

In the techniques, the picture other than the current picture that includes the current block is referred to as a candidate reference picture. The candidate reference picture includes a co-located block that is co-located with the current block in the current picture. For instance, the current block in the current picture and the co-located block in the candidate reference picture encompass the same area in respective pictures.

For determining a disparity vector of the current block from neighboring blocks, the video encoder and the video decoder may determine whether a block located to the bottom-right of the co-located block in the candidate reference picture is inter-predicted with a disparity motion vector. In this example, the block located to the bottom-right of the co-located block in the candidate reference picture is one example of a temporal neighboring block. If this temporal neighboring block is inter-predicted with a disparity motion vector, in some cases, the video encoder and the video decoder may derive the disparity vector for the current block based on the disparity motion vector.

However, accessing the motion information for the block located on the bottom-right of the co-located block in the candidate reference picture may increase processing complexity (e.g., requires identifying the co-located block, followed by the block in the bottom-right of the co-located block, and then determining its motion information). Moreover, the motion information for the block located on the bottom-right of the co-located block in the candidate reference picture may be stored in a different scan line in memory, requiring additional memory calls to retrieve the motion information.

For purposes of brevity, the block located on the bottom-right of the co-located block in the candidate reference picture is referred to as a bottom-right block or temporal neighboring block. The examples described in this disclosure describe a mechanism for determining whether the bottom-right block is available or unavailable for purposes of determining a disparity vector for the current block. If available, only then may the video encoder or the video decoder determine whether the bottom-right block is inter-predicted with a disparity motion vector, and if the bottom-right block is inter-predicted with a disparity motion vector, determine, in some cases, the disparity vector for the current block based on the disparity motion vector.

A largest coding unit (LCU) may cover the current block in the current picture (e.g., the LCU includes one or more blocks in the current picture and one of the blocks in the LCU is the current block). There may be a co-located LCU in the candidate reference picture, referred to as CLCU. The CLCU may include the co-located block that is co-located with the current picture. In the examples described in this disclosure, the video encoder and the video decoder may determine whether the bottom-right block is available or unavailable based on the location of the CLCU.

As one example, if the bottom-right block is outside the bottom boundary of the CLCU, the video encoder and the video decoder may determine that the block is unavailable. As another example, if the bottom-right block is outside the bottom boundary of the CLCU or outside the right boundary of the candidate reference picture, the video encoder and the video decoder may determine that the block is unavailable.

As another example, if the bottom-right block is outside the top or bottom boundary of the CLCU, but inside the left or right boundary of the CLCU, the video encoder and the video decoder may determine that the bottom-right block is unavailable. The vice-versa may also be another example. For instance, if the bottom-right block is outside the right or left boundary of the CLCU, but inside the top or bottom boundary of the CLCU, the video encoder and the video decoder may determine that the bottom-right block is unavailable.

In some examples, only a bottom-right block that is within the CLCU is considered to be available. In some example, only a bottom-right block that is with the CLCU or to the right of the CLCU is considered to be available.

It should be understood that any combination of the above examples may be possible in determining whether the bottom-right block is available or unavailable for purposes of deriving the disparity vector for the current block. If the bottom-right block is determined to be unavailable, the video encoder and the video decoder may not access the motion information of the bottom-right block determined to be unavailable to derive the disparity vector of the current block. In some examples, if the bottom-right block is determined to be unavailable, the video encoder and the video decoder may replace the bottom-right block with an available block in the candidate reference picture. In other words, when a temporal neighboring block is unavailable, the video encoder and the video decoder may replace it by another available temporal neighboring block.

FIG. 1 is a block diagram illustrating an example video encoding and decoding system in accordance with one or more examples described in this disclosure. For example, system 10 includes source device 12 and destination device 14. Source device 12 and destination device 14 are configured to implement multiview video coding in which source device 12 and destination device 14 each code pictures of different views.

System 10 may operate in accordance with different video coding standards, a proprietary standard, or any other way of multiview coding. For example, video encoder 20 and video decoder 30 may operate according to a video compression standard, such as the include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The recent, publicly available joint draft of the MVC extension is described in "Advanced video coding for generic audiovisual services," ITU-T Recommendation H.264, March 2010. A more recent, publicly available joint draft of the MVC extension is described in "Advanced video coding for generic audiovisual services," ITU-T Recommendation H.264, June 2011. A current joint draft of the MVC extension has been approved as of January 2012.

In addition, there is a new video coding standard, namely High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG The latest Working Draft (WD) of HEVC, and referred to as HEVC WD9 (SoDIS) hereinafter, is available from http://phenix.int-evey.fr/jct/doc_end_user/documents/11_Shanghai/wg11/JCTVC-K1003-v13.zip. Another recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 January, 2013, which is downloadable from http://phenix.int-evry.fr/jct/doc_end_user/documents/12_Geneva/wg11/JCTVC-L1003-v34. zip. Yet another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013, which is available from http://phenix.int-evry.fr/jct/doc_end_user/documents/13_Incheon/wg11/JCTVC-M0432-v3.zip.

For purposes of description, video encoder 20 and video decoder 30 are described in context of the HEVC or the H.264 standard and the extensions of such standards. The techniques of this disclosure, however, are not limited to any particular coding standard. Other examples of video compression standards include MPEG-2 and ITU-T H.263. Proprietary coding techniques, such as those referred to as On2 VP6/VP7/VP8, may also implement one or more of the techniques described herein.

The techniques of this disclosure are potentially applicable to several multiview coding and/or 3D video coding standards, including the HEVC-based 3D-Video (HEVC based 3DV). For example, a Joint Collaboration Team on 3D Video Coding (JCT-3V) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For MV-HEVC, there may only be high-level syntax (HLS) changes, such that no module in the coding unit (CU) or prediction unit (PU) level in HEVC needs to be re-designed. This may allow modules configured for HEVC to be reused for MV-HEVC. For 3D-HEVC, new coding tools, including those in coding unit (CU)/prediction unit (PU) level, for both texture and depth views may be included and supported.

The reference software description, as well as the working draft of 3D-HEVC is available as follows: Gerhard Tech, Krzysztof Wegner, Ying Chen, Sehoon Yea, "3D-HEVC Test Model Description draft 1," JCT3V-A1005, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012. The reference software, namely 3D-HTM version 5.0.1, which is available from https://hevc.hhi.fraunhofer.de/svn/svn_3DVCSoftware/trunk/tags/HTM-5.0.1. The reference software for MV-HEVC based on 3D-HTM, which is available from https://hevc.hhi.fraunhofer.de/svn/svn_3DVCSoftware/tags/HTM-5.1/. The software description and working draft for 3D-HEVC, which is available from http://phenix.it-sudparis.eu/jct2/doc_end_user/current_ document.php?id=460. All of these standards documents are incorporated by reference in their entirety.

The techniques of this disclosure may also be applicable to the H.264/3D-AVC and H.264/MVC+D video coding standards, or extensions thereof, as well as other coding standards. For example, the acronym MVC for multiview video coding refers to a video coding standard with is an extension of H.264/AVC. The techniques of this disclosure may at times be described with reference to or using terminology of a particular multiview coding or 3D video coding standard; however, such description should not be interpreted to mean that the described techniques are limited only to that particular standard.

As shown in FIG. 1, system 10 includes a source device 12 that generates encoded video data to be decoded at a later time by a destination device 14. Source device 12 and destination device 14 comprise any of a wide range of devices, including a wireless handset such as so-called "smart" phones, so-called "smart" pads, or other such wireless devices equipped for wireless communication. Additional examples of source device 12 and destination device 14 include, but are not limited to, a digital television, a device in digital direct broadcast system, a device in wireless broadcast system, a personal digital assistant (PDA), a laptop computer, a desktop computer, a tablet computer, an e-book reader, a digital camera, a digital recording device, a digital media player, a video gaming device, a video game console, a cellular radio telephone, a satellite radio telephone, a video teleconferencing device, and a video streaming device, or the like.

Destination device 14 may receive the encoded video data to be decoded via a link 16. Link 16 comprises any type of medium or device capable of moving the encoded video data from source device 12 to destination device 14. In one example, link 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data is output from output interface 22 to a storage device 33. Similarly, encoded data is accessed from storage device 33 by input interface 28. Examples of storage device 33 include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 33 corresponds to a file server or another intermediate storage device that holds the encoded video generated by source device 12. In these examples, destination device 14 accesses stored video data from storage device 33 via streaming or download. The file server is any type of server capable of storing encoded video data and transmitting that encoded video data to the destination device 14. Example file servers include a web server (e.g., for a website), an FTP server, network attached storage (NAS) devices, or a local disk drive. Destination device 14 accesses the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 33 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions (e.g., via the Internet), encoding of digital video for storage on a data storage medium, decoding of digital video stored on a data storage medium, or other applications. In some examples, system 10 is configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 includes a modulator/demodulator (modem) and/or a transmitter. In source device 12, video source 18 includes one or more of a source such as a video capture device (e.g., a video camera), a video archive containing previously captured video, a video feed interface to receive video from a video content provider, and/or a computer graphics system for generating computer graphics data as the source video, a combination of such sources, or any other source. As one example, if video source 24 is a video camera, source device 12 and destination device 14 may form so-called camera phones or video phones. However, the techniques described in this disclosure are applicable to video coding in general, and may be applied to wireless and/or wired applications.

Video encoder 20 encodes the captured, pre-captured, or computer-generated video. Output interface 22 of source device 12 is configured to transmit the encoded video data to destination device 14. The encoded video data may also (or alternatively) be stored onto storage device 33 for later access by destination device 14 or other devices, for decoding and/or playback.

Destination device 14 includes an input interface 28, a video decoder 30, and a display device 32. In some cases, input interface 28 includes a receiver and/or a modem. Input interface 28 of destination device 14 receives the encoded video data over link 16 or from storage device 33. The encoded video data communicated over link 16, or provided on storage device 33, includes a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 includes an integrated display device and also configured to interface with an external display device. In other examples, destination device 14 is a display device. In general, display device 32 displays the decoded video data to a user, and comprises any of a variety of display devices such as a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, integrated circuit (IC), software, hardware, firmware or any combinations thereof. In some examples, video encoder 20 and video decoder 30 may be part of a wireless handset device. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. Video encoder 20 is configured to encode video data and video decoder 30 is configured to decode video data in accordance with techniques described in this disclosure.

Although not shown in FIG. 1, in some aspects, video encoder 20 and video decoder 30 are each integrated with an audio encoder and decoder, and include appropriate MUX-DEMUX units, or other hardware and software, to handle encoding of both audio and video in a common data stream or separate data streams. If applicable, in some examples, MUX-DEMUX units conform to the ITU H.223 multiplexer protocol, or other protocols such as the user datagram protocol (UDP).

Figure 2:
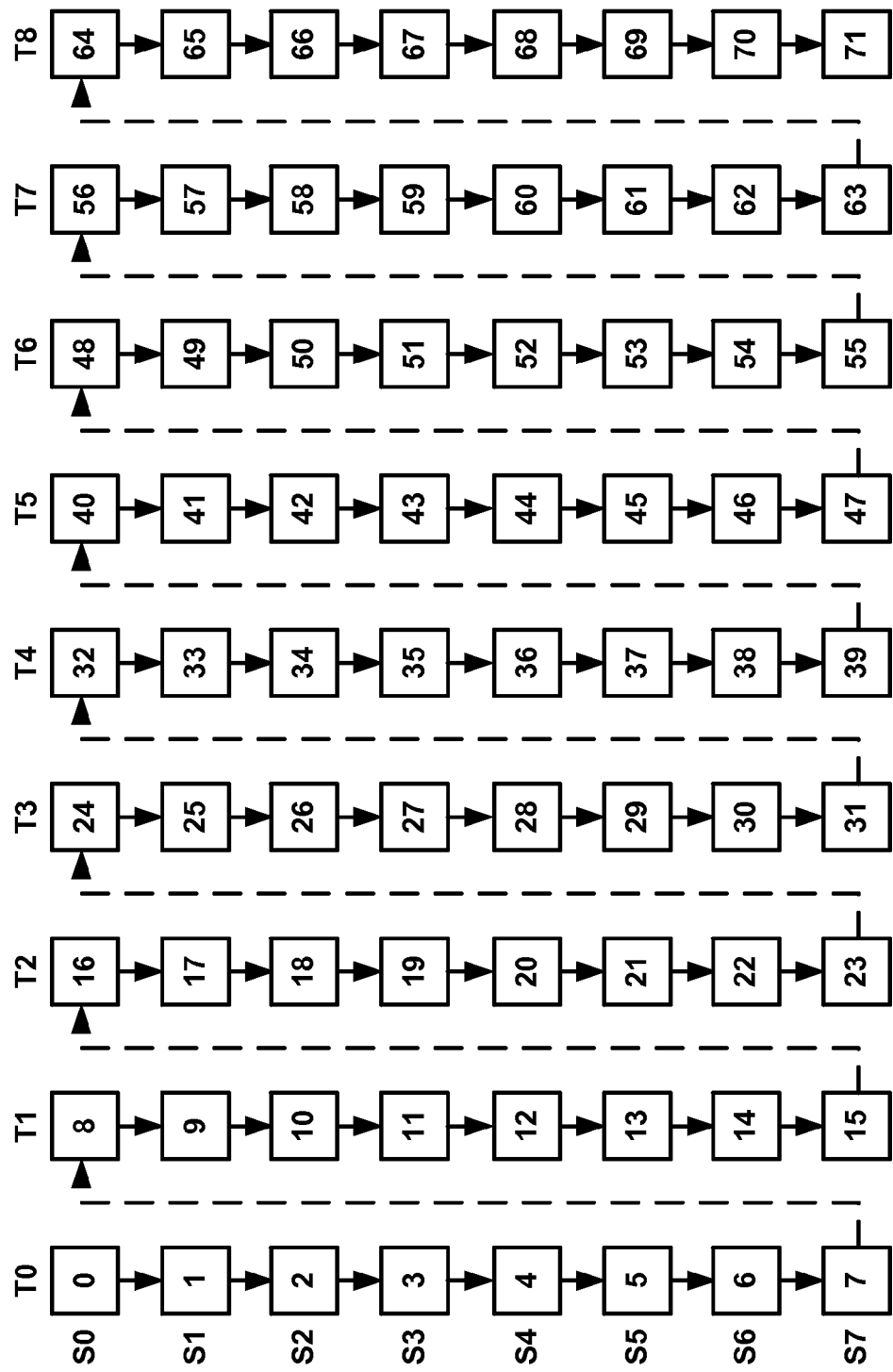
FIG. 2 is a graphical diagram illustrating an example encoding or decoding order, in accordance with one or more examples described in this disclosure.

FIG. 2 is a graphical diagram illustrating an example encoding or decoding order, in accordance with one or more examples described in this disclosure. For example, the decoding order arrangement illustrated in FIG. 2 is referred to as time-first coding. It should be understood that the decoding order illustrated in FIG. 2 may not be the same as the output or display order.

In FIG. 2, S0-S7 each refers to different views of the multiview video. T0-T8 each represents one output time instance. An access unit may include the coded pictures of all the views for one output time instance. For example, a first access unit includes all of the views S0-S7 for time instance T0 (i.e., pictures 0-7), a second access unit includes all of the views S0-S7 for time instance T1 (i.e. pictures 8-15), and so forth. In this examples, pictures 0-7 are at a same time instance (i.e., time instance T0), pictures 8-15 at a same time instance (i.e., time instance T1). Pictures with the same time instance are generally displayed at the same time, and it is the horizontal disparity, and possibly some vertical disparity, between the objects within the pictures of the same time instance that cause the viewer to perceive an image that encompasses a 3D volume.

In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view can be considered as corresponding to the depth view component within the set of the pictures of the view, and vice-versa (i.e., the depth view component corresponds to its texture view component in the set, and vice-versa). As used in this disclosure, a texture view component and a depth view component that correspond may be considered to be part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component may be similar to a gray scale image that includes only luma values. In other words, the depth view component may not convey any image content, but rather provide a measure of the relative depths of the pixels in the texture view component.

For example, a pixel value corresponding to a purely white pixel in the depth view component may indicate that its corresponding pixel or pixels in the corresponding texture view component is closer from the perspective of the viewer, and a pixel value corresponding to a purely black pixel in the depth view component may indicate that its corresponding pixel or pixels in the corresponding texture view component is further away from the perspective of the viewer. The pixel values corresponding to the various shades of gray in between black and white indicate different depth levels. For instance, a very gray pixel in the depth view component indicates that its corresponding pixel in the texture view component is further away than a slightly gray pixel in the depth view component. Because only one pixel value, similar to gray scale, is needed to identify the depth of pixels, the depth view component may include only one pixel value. Thus, values analogous to chroma components are not needed.

The depth view component using only luma values (e.g., intensity values) to identify depth is provided for illustration purposes and should not be considered limiting. In other examples, any technique may be utilized to indicate relative depths of the pixels in the texture view component.

In accordance with multiview video coding, the texture view components are inter-predicted from texture view components in the same view or from texture view components in one or more different views. The texture view components may be coded in blocks of video data, which are referred to as "video blocks" and commonly called "macroblocks" in the H.264 context. Other video coding standards, such as the HEVC standard, may refer to video blocks as treeblocks or coding units (CUs).

The pictures of any similar time instance may include similar content. However, the video content of different pictures in a similar time instance may be slightly displaced in the horizontal direction relative to one another. For example, if a block is located at (x, y) in picture 0 of view S0, a block located at (x+x', y) in picture 1 of view S1 includes similar video content as the block located at (x, y) in picture 0 of view S0. In this example, the block located at (x, y) in picture 0 of view S0 and the block located at (x+x', y) in picture 1 of view S1 are considered as corresponding blocks. In some examples, a disparity vector for the block located at (x+x', y) in picture 1 of view S1 refers to the location of its corresponding block. For example, the disparity vector for the block located at (x+x', y) is (−x', 0).

In some examples, video encoder 20 or video decoder 30 may utilize the disparity vector of a block in a picture of a first view to identify the corresponding block in a picture of a second view. Video encoder 20 and video decoder 30 may, for example, utilize the disparity vector when performing inter-view motion prediction or inter-view residual prediction. Video encoder 20 and video decoder 30 may, for example, perform inter-view motion prediction by using information of a reference block of a reference picture in a reference view determined by the disparity vector of the current block.

Figure 3:
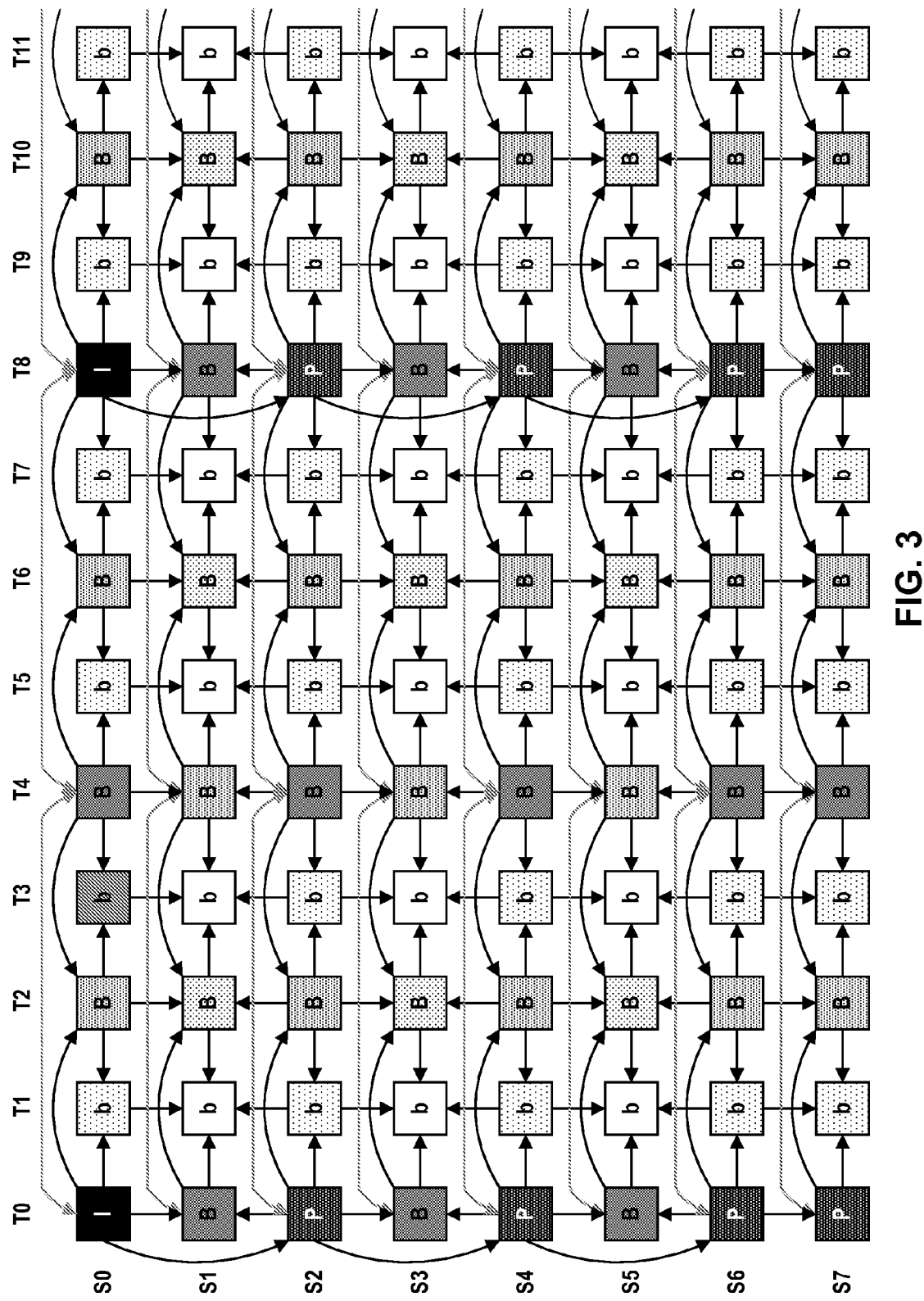
FIG. 3 is a conceptual diagram illustrating an example prediction pattern.

FIG. 3 is a conceptual diagram illustrating an example prediction pattern. In the example of FIG. 3, eight views (having view IDs "S0" through "S7") are illustrated, and twelve temporal locations ("T0" through "T11") are illustrated for each view. That is, each row in FIG. 3 corresponds to a view, while each column indicates a temporal location. In the example of FIG. 3, capital "B" and lowercase "b" are used to indicate different hierarchical relationships between pictures, rather than different coding methodologies. In general, capital "B" pictures are relatively higher in the prediction hierarchy than lowercase "b" frames.

In FIG. 3, motion vectors are indicated by arrows, with the pointed to picture using the pointed from picture as a prediction reference. In multiview coding, a block of a picture in a first view may be inter-predicted with a block of a picture in another, second view. Such inter-prediction is referred to as inter-view prediction, and the motion vector that refers to a picture in another view is referred to as a disparity motion vector. For instance, in some examples, such as MVC, the inter-view prediction is supported by disparity motion compensation, which may use the syntax of the H.264/AVC motion compensation, but allows a picture in a different view to be used as a reference picture.

The term "reference picture" and "candidate reference picture" should not be confused. The term "reference picture" by itself refers to a picture that includes a predictor block, and video encoder 20 and video decoder 30 utilize residual data between the predictor block and the current block to inter-predict the current block. The term "candidate reference picture," as used in this disclosure, refers to a picture, other than the current picture, that includes a block whose disparity motion vector is used to derive the disparity vector of the current block. Video encoder 20 and video decoder 30 may not determine residual data between this block in the candidate reference picture and the current block. Rather, video encoder 20 and video decoder 30 may utilize the motion vector of this block in the candidate reference picture (i.e., the disparity motion vector) to derive the disparity vector of the current block.

In FIG. 3, view S0 may be considered as a base view, and views S1-S7 may be considered as dependent views. A base view includes pictures that are not inter-view predicted. Picture in a base view can be inter-predicted with respect to other pictures in the same view. For instance, none of the pictures in view S0 can be inter-predicted with respect to a picture in any of views S1-S7, but some of the pictures in view S0 can be inter-predicted with respect to other pictures in view S0.

A dependent view includes pictures that are inter-view predicted. For example, each one of views S1-S7 includes at least one picture that is inter-predicted with respect to a picture in another view. Pictures in a dependent view may be inter-predicted with respect to pictures in the base view, or may be inter-predicted with respect to pictures in other dependent views.

A video stream that includes both a base view and one or more dependent views may be decodable by different types of video decoders. For example, one basic type of video decoder may be configured to decode only the base view. In addition, another type of video decoder may be configured to decode each of views S0-S7. A decoder that is configured to decode both the base view and the dependent views may be referred to as a decoder that supports multiview coding.

Pictures in FIG. 3 are indicated at the intersection of each row and each column in FIG. 3. The H.264/AVC standard with multiview coding extensions may use the term frame to represent a portion of the video, while HEVC standard may use the term picture to represent a portion of the video. This disclosure uses the term picture and frame interchangeably.

The pictures in FIG. 3 are illustrated using a shaded block including a letter, designating whether the corresponding picture is intra-coded (that is, an I-picture), inter-coded in one direction (that is, as a P-picture), or inter-coded in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video coding, pictures of a multiview video coding video sequence may be predictively encoded with respect to pictures at different temporal locations. For example, the B-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component (e.g., a texture view component) can use the view components in other views for reference. In multiview coding, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

In this way, video encoder 20 may be able to receive multiple views as 3D video input and encode the multiple views into a coded bitstream. Video decoder 30 may be configured to decode such a multiview representation such that destination device 14 with video decoder 30 may expect 3D video content with one or more views.

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the B-picture of view S1 at temporal location T1 is predicted from each of the B-pictures of view S1 at temporal locations T0 and T2, as well as the B-pictures of views S0 and S2 at temporal location T1.

FIG. 3 also illustrates variations in the prediction hierarchy using different levels of shading, where a greater amount of shading (that is, relatively darker) frames are higher in the prediction hierarchy than those frames having less shading (that is, relatively lighter). For example, all I-pictures in FIG. 3 are illustrated with full shading, while P-pictures have a somewhat lighter shading, and B-pictures (and lowercase b-pictures) have various levels of shading relative to each other, but always lighter than the shading of the P-pictures and the I-pictures.

In general, the prediction hierarchy may be related to view order indexes, in that pictures relatively higher in the prediction hierarchy should be decoded before decoding pictures that are relatively lower in the hierarchy. Those pictures relatively higher in the hierarchy can be used as reference pictures during decoding of the pictures relatively lower in the hierarchy. A view order index is an index that indicates the decoding order of view components in an access unit. The view order indices are implied in the sequence parameter set (SPS) MVC extension, as specified in Annex H of H.264/AVC (the MVC amendment). In the SPS, for each index i, the corresponding view_id is signaled. The decoding of the view components shall follow the ascending order of the view order index. If all the views are presented, then the view order indexes are in a consecutive order from 0 to num_views_minus_1.

In this manner, pictures used as reference pictures are decoded before pictures that depend on the reference pictures. A view order index is an index that indicates the decoding order of view components in an access unit. For each view order index i, the corresponding view_id is signaled. The decoding of the view components follows the ascending order of the view order indexes. If all the views are presented, then the set of view order indexes may comprise a consecutively ordered set from zero to one less than the full number of views.

For certain pictures at equal levels of the hierarchy, the decoding order may not matter relative to each other. For example, the I-picture of view S0 at temporal location T0 may be used as a reference picture for the P-picture of view S2 at temporal location T0, which, in turn, may be used as a reference picture for the P-picture of view S4 at temporal location T0. Accordingly, the I-picture of view S0 at temporal location T0 should be decoded before the P-picture of view S2 at temporal location T0, which in turn, should be decoded before the P-picture of view S4 at temporal location T0. However, between views S1 and S3, a decoding order does not matter, because views S1 and S3 do not rely on each other for prediction. Instead views S1 and S3 are predicted only from other views that are higher in the prediction hierarchy. Moreover, view S1 may be decoded before view S4, so long as view S1 is decoded after views S0 and S2.

In this manner, a hierarchical ordering may be used to describe views S0 through S7. In this disclosure, the notation "SA>SB" means that view SA should be decoded before view SB. Using this notation, S0>S2>S4>S6>S7, in the example of FIG. 2. Also, with respect to the example of FIG. 2, S0>S1, S2>S1, S2>S3, S4>S3, S4>S5, and S6>S5. Any decoding order for the views that does not violate this hierarchical ordering is possible. Accordingly, many different decoding orders are possible, with limitations based on the hierarchical ordering.

In some examples, FIG. 3 may be viewed as illustrating the texture view components. In these examples, to implement inter-view prediction (e.g. inter-view motion prediction or inter-view residual prediction), video encoder 20 or video decoder 30 may in some cases locate a corresponding block using a disparity vector and utilize the motion vector of the corresponding block as a motion vector predictor for the current block that is to be inter-predicted for inter-view motion prediction or inter-view residual prediction. The techniques described in this disclosure determine the disparity vector of the current block without necessarily needing to derive the depth view component, and without necessarily relying on a global disparity vector.

A video sequence typically includes a series of video pictures from a view (e.g., views illustrated in FIGS. 2 and 3). A group of pictures (GOP) generally comprises a series of one or more video pictures. A GOP may include syntax data in a header of the GOP, a header of one or more pictures of the GOP, or elsewhere, that describes a number of pictures included in the GOP. Each picture may include picture syntax data that describes an encoding mode for the respective picture. Video encoder 20 typically operates on video blocks within individual video pictures in order to encode the video data. A video block may correspond to a macroblock, a partition of a macroblock, and possibly a sub-block of a partition, as defined in the H.264/MVC standard or largest coding units (LCUs), coding units (CUs), prediction units (PUs), or transform units (TUs), as defined in the HEVC standard. The video blocks may have fixed or varying sizes, and may differ in size according to a specified coding standard. Each video picture may include a plurality of slices. Each slice may include a plurality of blocks.

As an example, the ITU-T H.264 standard supports intra prediction in various block sizes, such as 16 by 16, 8 by 8, or 4 by 4 for luma components, and 8×8 for chroma components, as well as inter-prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions (e.g., 16×16 pixels or 16 by 16 pixels). In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

When the block is intra-mode encoded (e.g., intra-predicted), the block may include data describing an intra-prediction mode for the block. As another example, when the block is inter-mode encoded (e.g., inter-predicted), the block may include information defining a motion vector for the block. This motion vector refers to a reference picture in the same view, or refers to a reference picture in another view. The data defining the motion vector for a block describes, for example, a horizontal component of the motion vector, a vertical component of the motion vector, a resolution for the motion vector (e.g., one-quarter pixel precision or one-eighth pixel precision). In addition, when inter-predicted, the block may include reference index information such as a reference picture to which the motion vector points, and/or a reference picture list (e.g., RefPicList0 or RefPicList1) for the motion vector.

The JCT-VC is working on completing the HEVC standard. The HEVC standardization efforts are based on an evolving model of a video coding device referred to as the HEVC Test Model (HM). The HM presumes several additional capabilities of video coding devices relative to existing devices according to (e.g., ITU-T H.264/AVC). For example, whereas H.264 provides nine intra-prediction encoding modes, the HM may provide as many as thirty-three directional/angular intra-prediction encoding modes plus DC and Planar modes.

The working model of the HM describes that a video picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video picture may be partitioned into one or more slices. Each treeblock may be split into coding units (CUs) according to a quadtree.

For example, a treeblock, as a root node of the quadtree, may be split into four child nodes, and each child node may in turn be a parent node and be split into another four child nodes. A final, unsplit child node, as a leaf node of the quadtree, comprises a coding node (i.e., a coded video block). Syntax data associated with a coded bitstream may define a maximum number of times a treeblock may be split, and may also define a minimum size of the coding nodes. Treeblocks are referred to as LCUs in some examples.

A CU includes a coding node and one or more prediction units (PUs) and one or more transform units (TUs) associated with the coding node. A size of the CU corresponds to a size of a coding block and may square in shape. In some examples, the size of the CU ranges from 8×8 pixels up to the size of the treeblock with a maximum of 64×64 pixels or greater. In some examples, each CU contains one or more PUs and one or more TUs. Syntax data associated with a CU describe, for example, partitioning of the CU into one or more PUs. Partitioning modes differ between whether the CU is skip or direct mode encoded, intra-prediction mode encoded, or inter-prediction mode encoded. PUs can be partitioned to be non-square in shape, in some examples. Syntax data associated with a CU also describes, for example, partitioning of the CU into one or more TUs according to a quadtree. A transform block associated with a TU can be square or non-square in shape.

The HEVC standard allows for transformations according to TUs, which may be different for different CUs. The TUs are typically sized based on the size of PUs within a given CU defined for a partitioned LCU, although this is not always the case. The TUs are typically the same size or smaller than the PUs. In some examples, residual samples corresponding to a CU are subdivided into smaller units using a quadtree structure known as "residual quad tree" (RQT). The leaf nodes of the RQT can be referred to as TUs. Pixel difference values associated with the TUs are transformed to produce transform coefficients, which are quantized, in some examples.

A PU includes data related to the prediction process. For example, when the PU is intra-mode encoded, the PU includes data describing an intra-prediction mode for the PU. As another example, when the PU is inter-mode encoded, the PU may include data defining a motion vector for the PU. The data defining the motion vector for a PU describes, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

A TU is used for the transform and quantization processes. A given CU having one or more PUs may also include one or more transform units (TUs). Following prediction of a PU, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

As an example, the HM supports prediction in various PU sizes. Assuming that the size of a particular CU is 2N×2N, the HM supports intra prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In either the H.264 standard or the HEVC standard, following intra-predictive or inter-predictive coding, video encoder 20 calculates residual data for the TUs of the CU, in HEVC or for macroblock in H.264. The PUs comprise pixel data in the spatial domain (also referred to as the pixel domain) and the TUs comprise coefficients in the transform domain following application of a transform (e.g., a discrete cosine transform (DCT)), an integer transform, a wavelet transform, or a conceptually similar transform to residual video data. The residual data may correspond to pixel differences between pixels of the unencoded picture and prediction values corresponding to the PUs in HEVC or prediction values for the macroblock in H.264.

Following any transforms to produce transform coefficients, video encoder 20 performs quantization of the transform coefficients, in some examples. Quantization generally refers to a process in which transform coefficients are quantized to possibly reduce the amount of data used to represent the coefficients, providing further compression. The quantization process reduces the bit depth associated with some or all of the coefficients. For example, an n-bit value is rounded down to an m-bit value during quantization, where n is greater than m.

In some examples, video encoder 20 utilizes a predefined scan order to scan the quantized transform coefficients to produce a serialized vector that can be entropy encoded. In other examples, video encoder 26 performs an adaptive scan. After scanning the quantized transform coefficients to form a one-dimensional vector, in some examples, video encoder 20 entropy encodes the syntax elements that represent the quantized transform coefficients according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology, as a few examples. Video encoder 20 also entropy encodes syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

As described above, video encoder 20 and video decoder 30 may inter-predict a current block within a current picture of a first view with reference to a predictor block within a reference picture of a second view. Such inter-prediction is referred to as inter-view prediction. The time instance of the current picture and the reference picture may be the same in respective views. In this example, video encoder 20 or video decoder 30 perform inter-view prediction across pictures in a same access unit, where pictures in the same access unit are at the same time instance.

To perform inter-prediction, including inter-view prediction, on the current block, video encoder 20 or video decoder 30 construct reference picture lists that identify reference pictures that can be used for inter-prediction, including pictures that can be used for inter-view prediction. Inter-prediction (or inter-prediction encoding or decoding) refers to predicting a current block in a current picture with respect to a predictor block in a reference picture. Inter-view prediction is a subset of inter-prediction in that in inter-view prediction, the reference picture is in a view different than the view of the current picture. Accordingly, for inter-view prediction, video encoder 20 and video decoder 30 add the reference picture in the other view in one or both of the constructed reference picture lists. The reference picture in the other view can be identified at any location within the constructed reference picture lists.

For example, for a bi-directionally predicted picture (B-picture), video encoder 20 and video decoder 30 may construct RefPicList0 and RefPicList1. The construction of RefPicList0 and RefPicList1 may include two steps: an initialization step and a reordering (modification) step. In the initialization step, video encoder 20 and video decoder 30 include pictures in a reference picture memory (also referred to as a decoded picture buffer (DPB)) into one or both of RefPicList0 and RefPicList1 based the order of picture order count (POC) values of the reference pictures. The POC value of a picture indicates its display or output order.

In the modification step, video encoder 20 and video decoder 30 may modify the position of a picture in the initial list to another position in the list, or include a picture not currently in the reference picture list(s) into the list(s). In some cases, if the modification step indicates that a picture should be moved beyond the last entry in the list, then the picture is removed from the list(s). The number of entries in a list may be referred to as the number of active reference pictures in the list. Video encoder 20 may signal in the coded bitstream and video decoder 30 may receive from the coded bitstream the number of active reference pictures in the list(s) in the slice header.

Video encoder 20 may signal in the coded bitstream and video decoder 30 may receive from the coded bitstream an index into one or both of RefPicList0 and RefPicList1. Video encoder 20 may have used the picture or pictures identified in by the index or indices into RefPicList0 and RefPicList1 for inter-prediction encoding the current picture, and video decoder 30 may use the picture or pictures identified in by the index or indices into RefPicList0 and RefPicList1 for inter-prediction decoding the current picture.

As used in this disclosure, when video encoder 20 is performing inter-prediction (e.g., inter-predicting) on a block, video encoder 20 may be considered as inter-prediction encoding a block. When video decoder 30 is performing inter-prediction (e.g., inter-predicting) on a block, video decoder 30 may be considered as inter-prediction decoding a block.

In inter-prediction, a motion vector for the current block identifies a location of the block that is to be used as the reference block for inter-predicting the current block, and a reference index into one or both of the constructed reference picture lists identifies the reference picture that includes the block that is be used as the reference block for inter-predicting the current block. In multiview coding, there are at least two types of motion vectors. A temporal motion vector refers to a temporal reference picture, where a temporal reference picture is a picture within the same view as the picture that includes the block to be predicted, and where the temporal reference picture is displayed earlier or later than the picture that includes the block to be predicted. A disparity motion vector refers to a reference picture in a view other than the view in which the picture that includes the block to be predicted. When video encoder 20 or video decoder 30 utilizes temporal motion vectors, video encoder 20 and video decoder 30 are considered as implementing motion-compensated prediction (MCP). When video encoder 20 or video decoder 30 utilizes disparity motion vectors, video encoder 20 and video decoder 30 are considered as implementing disparity-compensated prediction (DCP), or inter-view prediction.

This disclosure describes techniques for determining a disparity vector for a current block based on motion information (e.g. a disparity motion vector) of spatial and/or temporal neighboring blocks, and in some cases based on a derived disparity vector for neighboring blocks. In other words, a disparity vector for a current block may be determined by analyzing the motion vectors of one or more spatial and/or temporal neighboring blocks that are coded with DCP, and in some examples, from a derived disparity vector of the neighboring blocks. The techniques of this disclosure may be implemented by one or both of video encoder 20 and video decoder 30. These techniques may, for example, be used in conjunction with HEVC-based multiview video coding and/or HEVC-based 3D video coding, or H.264/AVC or H.264/MVC.

As described above, the disparity motion vector and the disparity vector should not be confused. Video encoder 20 and video decoder 30 use the disparity motion vector to identify a video block of a picture in a different view than the view that includes picture with the block to be predicted, and uses the pixel values of the identified video block to inter-predict the block. Video encoder 20 and video decoder 30 need not necessarily use the pixel values of the block referred to by the disparity vector to inter-predict another video block; rather, the disparity vector provides a measure of the displacement of the video block in the other view.

Examples of the neighboring blocks includes spatially neighboring blocks (e.g., blocks that neighbor the current video block that are in the same picture as the current video block) or temporally neighboring blocks (e.g., blocks that neighbor or are co-located with the current block but are in the different picture than the current video block). The picture that includes the temporally neighboring block is referred to as a candidate reference picture (or candidate picture).

There may be up to two candidate reference pictures. The first candidate reference picture may be a picture that video encoder 20 identifies in the coded bitstream that video decoder 30 receives. For example, the first candidate may be the co-located reference picture which is used in motion prediction process. The co-located reference picture may be identified by the values of 'collocated_from_l0_flag' and 'collocated_ref_idx' in slice header. The collocated_from_l0_flag syntax element may identify the reference picture list that includes the first candidate reference picture (e.g., a value of 1 identifies RefPicList0 and a value of 0 identifies RefPicList1, or vice-versa). The collocated_ref_idx syntax element may indicate the index into identified reference picture list.

The second candidate reference picture may be a picture that video encoder 20 and video decoder 30 identify using implicit techniques. For example, video encoder 20 and video decoder 30 may identify the second candidate reference picture as a random-access picture, if one exists. If a random-access picture does not exist, video encoder 20 and video decoder 30 may identify a reference picture that is closest to the current picture in output or display order (i.e., as determined with by the POC values) and with the smallest temporal identification value (temporalID). These candidate reference pictures (i.e., the first and second candidate reference pictures) include the temporally neighboring blocks, as described in more detail below, that video encoder 20 and video decoder 30 evaluate to determine whether they are inter-predicted with a disparity motion vector.

If any of these spatially neighboring blocks or temporally neighboring blocks is inter-predicted with a disparity motion vector, video encoder 20 and video decoder 30 may set the disparity motion vector of one of the neighboring blocks as the disparity vector for the current block. In other words, video encoder 20 and video decoder 30 adopt the disparity motion vector of one of the neighboring blocks as the disparity vector of the current block. In this way, video encoder 20 and video decoder 30 may determine the disparity vector for the current block based on the motion vector information of neighboring blocks that are inter-predicted with a disparity motion vector.

If the disparity motion vector of a spatially neighboring block is set as the disparity vector for the current block, the disparity vector is referred to as a spatial disparity vector (SDV). If the disparity motion vector of a temporally neighboring block is set as the disparity vector for the current block, the disparity vector is referred to a temporal disparity vector (TDV).

In some examples, techniques for using neighboring blocks to determine the disparity vector are expanded to include an implicit disparity vector (IDV). The IDV is a disparity vector of a neighboring block that video encoder 20 and video decoder 30 determined from disparity motion vectors of neighboring blocks of the neighboring block. For example, during the coding process (e.g., encoding or decoding), video encoder 20 or video decoder 30 may have determined a disparity vector for a neighboring block (e.g., a spatially or temporally neighboring block) even if the disparity vector for the neighboring block was not subsequently used to inter-predict the neighboring block. This disparity vector for the neighboring block may potentially be the disparity vector for the current block. For example, video encoder 20 and video decoder 30 may adopt the derived disparity vector for the neighboring block as the disparity vector for the current block. If the derived disparity vector of a neighboring block is set as the disparity vector for the current block, the disparity vector is referred to as an IDV.

In this manner, video encoder 20 and video decoder 30 may determine a disparity vector for the current block based on a disparity motion vector for a spatially neighboring block, a disparity motion vector for a temporally neighboring block, or a derived disparity vector for a spatially neighboring block or a temporally neighboring block. Determining the disparity vector for the current block, in this way, may promote coding efficiencies because video encoder 20 and video decoder 30 do not need to first construct the depth view component to determine depth, and then utilize the depth information to determine the disparity vector for the current block.

For instance, for a multiview video sequence, different views represent different projections of the same real world scene, which are synchronously captured with multiple cameras. The movement of an object in the real world scene is projected into all views according to the scene geometry. The geometry of a scene may be adequately represented by depth data or disparity vectors. In multiview video coding, disparity motion compensation is utilized where disparity motion vector may be chosen as the final motion vector in terms of rate-distortion. In addition, neighboring blocks may share almost the same motion information in video coding. Moreover, there may be a high correlation between the motion of current block and that of temporal blocks in reference pictures. Therefore, if the spatial/temporal neighboring blocks utilize inter-view prediction, its disparity motion vector can be treated as a good disparity vector predictor for current block.

Video encoder 20 and video decoder 30 may define several spatial and temporal neighboring blocks. Video encoder 20 and video decoder 30 may check the spatial and temporal neighboring blocks in a pre-defined order based on the priority of the correlation between the motion information of them and that of current block. Once a disparity motion vector (i.e., a motion vector points to an inter-view reference picture in the other view) is identified, video encoder 20 and video decoder 30 may convert the disparity motion vector to a disparity vector. In some examples, the techniques described in this disclosure may be dependent with the camera parameters.

Video encoder 20 and video decoder 30 may utilize the determined disparity vector for the current block for various purposes. As one example, video encoder 20 and video decoder 30 may utilize the disparity vector to identify the block to which the disparity vector refers, and identify the motion vector for the block to which the disparity vector refers. Video encoder 20 and video decoder 30 may utilize the motion vector for the block to which the disparity vector refers for predicting the motion vector of the current block, as part of inter-view motion prediction. The concept of inter-view motion prediction is described in more detail below. As another example, video encoder 20 and video decoder 30 may utilize the residual pixel values of the block that is referred to by the disparity vector for inter-predicting the residual values of the current block, as part of inter-view residual prediction. The disparity vector may be utilized for other coding tools as well.

In some examples, if none of the neighboring blocks (e.g., spatially or temporally neighboring blocks) are inter-predicted with a disparity motion vector and no IDV exists for the neighboring blocks, video encoder 20 and video decoder 30 may utilize a zero disparity vector for inter-view motion prediction. Where no disparity motion vector and no IDV is found, video encoder 20 and video decoder 30 may disable inter-view residual prediction for the block.

To determine which disparity motion vector should be set as the disparity vector for the current block, video encoder 20 and video decoder 30 may evaluate the disparity motion vectors in a certain order. For instance, video encoder 20 and video decoder 30 may first determine whether any of the spatially neighboring blocks are inter-predicted with a disparity motion vector, and if so, set the disparity motion vector of the spatially neighboring block as the disparity vector for the current block and end the process of determining the disparity vector for the current block. If none of the spatially neighboring blocks are inter-predicted with a disparity motion vector, video encoder 20 and video decoder 30 may determine whether temporally neighboring blocks in one or more candidate reference pictures are inter-predicted with a disparity motion vector, and if so, set the disparity motion vector of the temporally neighboring block as the disparity vector for the current block and end the process of determining the disparity vector for the current block. If none of the temporally neighboring blocks are inter-predicted with a disparity motion vector, video encoder 20 and video decoder 30 may determine whether a derived disparity vector (i.e., IDV) for one of the neighboring blocks exists, and set that derived disparity vector as the disparity vector for the current block. In some examples, the order of evaluating spatial neighboring blocks, temporal neighboring blocks, and derived disparity vectors may be different.

Figure 4:
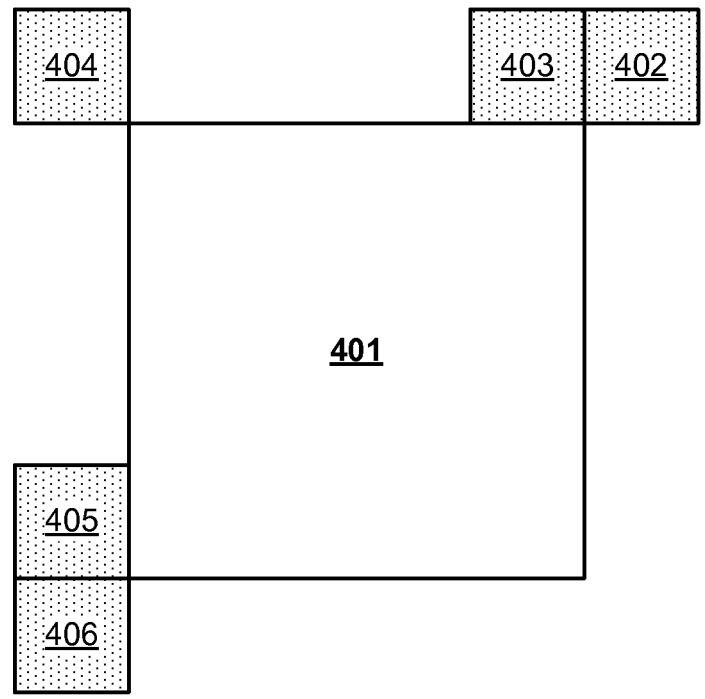
FIG. 4 is a conceptual diagram illustrating a current block and five spatial neighboring blocks.

FIG. 4 is a conceptual diagram illustrating a current block and five spatial neighboring blocks. For example, FIG. 4 illustrates a current block 401 and five spatial neighboring blocks (402, 403, 404, 405, and 406). In FIG. 4, a luma location (xP, yP) specifies the top-left luma sample of block 401 relative to the top-left sample of the current picture that includes block 401. Accordingly, the top-left luma same of a current block, referred to in this examples as PU "N", relative to the top-left sample of the current picture is (xN, yN). Variables nPSW and nPSH denote the width and height of block 601 for luma. In this example, (xN, yN), with N being replaced by 406, 405, 404, 403, and 402 to identify one of blocks 402-406 is defined as (xP−1, yP+nPSH), (xP−1, yP+nPSH−1), (xP+nPSW, yP−1), (xP+nPSW−1, yP−1) or (xP−1, yP−1), respectively. In this manner, video decoder 30 determines the location of the spatially neighboring blocks.

Figure 8:
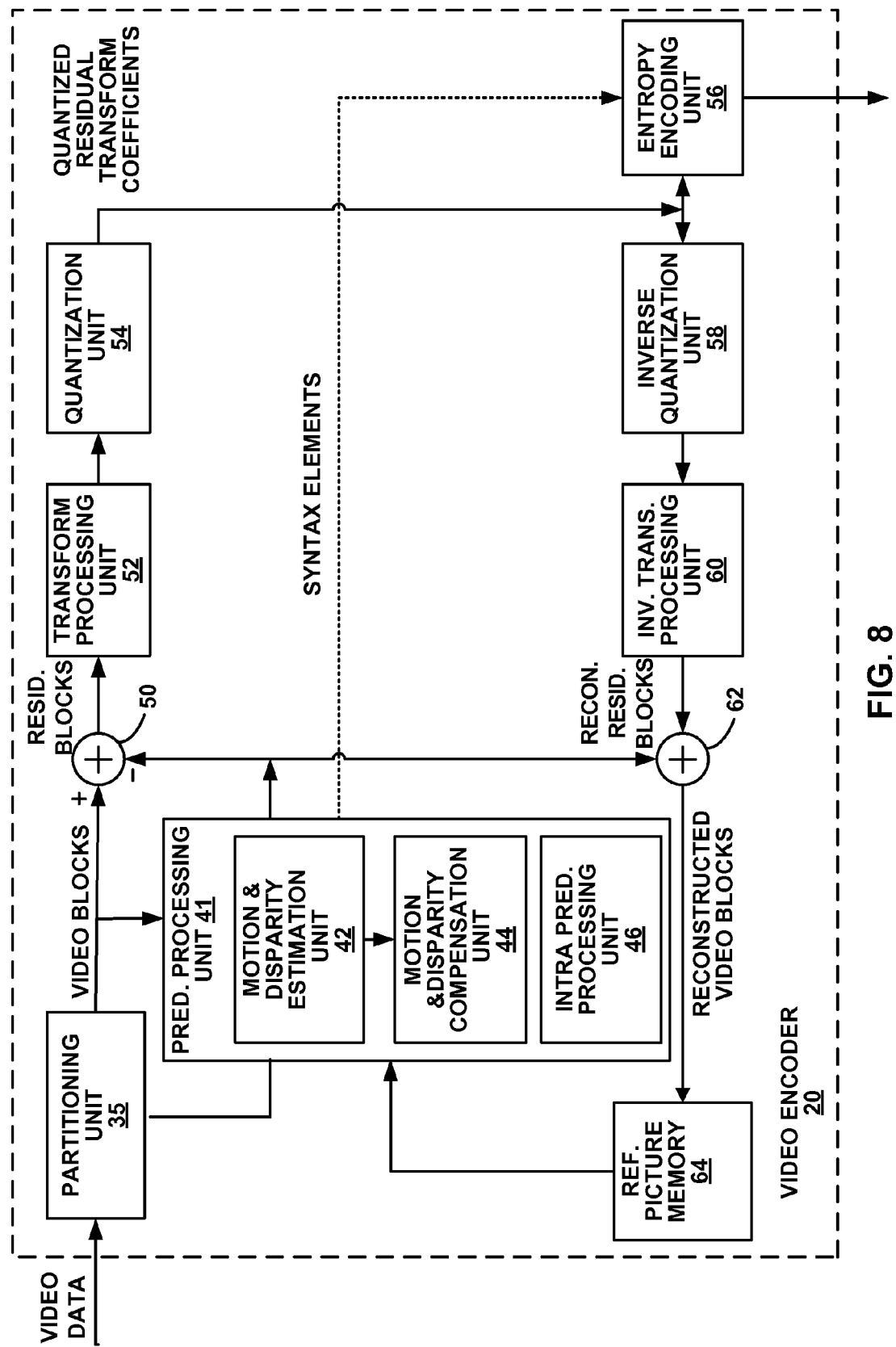
FIG. 8 is a block diagram illustrating an example video encoder that may implement the techniques described in this disclosure.

According to the techniques of this disclosure, motion information of these spatially neighboring blocks (e.g. blocks 402-406) can be evaluated as part of determining a disparity vector for block 401. For example, video encoder 20 and video decoder 30 may evaluate the spatially neighboring blocks 402-406 in a particular order, and as soon as video encoder 20 and video decoder 30 determine that a spatially neighboring block is inter-predicted with disparity motion vector, video encoder 20 and video decoder 30 may cease evaluation of any remaining neighboring blocks, and derive the disparity vector from the disparity motion vector. In some examples, the order in which video encoder 20 and video decoder 30 evaluate the spatially neighboring blocks is: 405, 403, 402, 406, and 404. In FIG. 8-3, in the HEVC standard, block 405 is referred to A1, block 403 is referred to as B1, block 402 is referred to as B0, block 406 is referred to as A0, and block 404 is referred to as B2. However, this order in which video encoder 20 and video decoder 30 evaluate the spatially neighboring blocks is provided for purposes of illustration and should not be considered limiting.

As described above, for disparity vector derivation, video encoder 20 and video decoder 30 may determine whether a spatial neighboring block such as those illustrated in FIG. 4 are inter-predicted with a disparity motion vector, and if no spatial neighboring block is inter-predicted with a disparity motion vector, video encoder 20 and video decoder 30 may determine whether blocks in a candidate reference picture are inter-predicted with a disparity motion vector.

Examples of the candidate reference picture include a co-located picture identified in a slice header or one of a random access picture or a reference picture with the smallest difference in POC value relative to the current picture and with the smallest temporal identification value. Video encoder 20 and video decoder 30 may evaluate two candidate blocks within the candidate pictures in a given order, and as soon as video encoder 20 and video decoder 30 determine that a candidate block is inter-predicted with a disparity motion vector, video encoder 20 and video decoder 30 may utilize that disparity motion vector to derive the disparity vector of the current block. In some examples, video encoder 20 and video decoder 30 may start with the random access picture followed by the co-located picture; however, the techniques described in this disclosure are not so limited.

Figure 5:
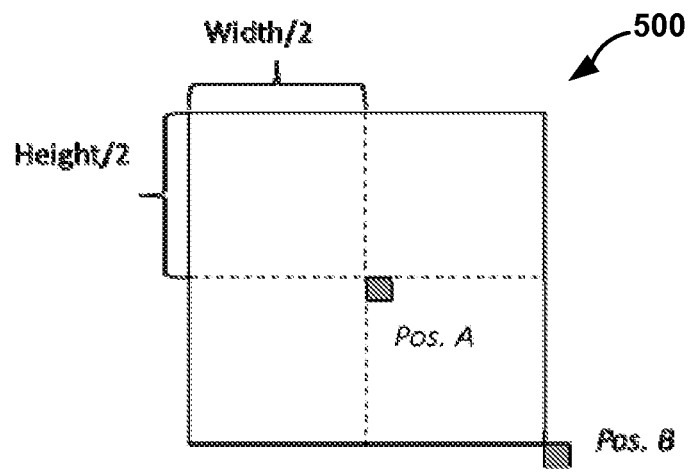
FIG. 5 is a conceptual diagram illustrating a co-located region in a candidate reference picture.

FIG. 5 is a conceptual diagram illustrating a co-located region in a candidate reference picture. For example, FIG. 5 illustrates an example of a candidate reference picture that video encoder 20 and video decoder 30 evaluate to determine whether a block within the candidate reference picture is inter-predicted with a disparity motion vector. In some examples, video encoder 20 and video decoder 30 may determine which blocks within the candidate reference pictures to evaluate. For example, the blocks within the candidate reference pictures that video encoder 20 and video decoder 30 evaluate may be based on a co-located region.

The current block in the current picture may encompass a certain region within the current picture. The co-located region refers to the same region in a candidate reference picture that the current block encompasses in the current picture. In other words, the co-located region and the current block encompass the same relative area within respective pictures. Stated yet another way, the position of the co-located region in a candidate reference picture may be the same as the position of the region that the current block encompasses in the current picture.

FIG. 5 illustrates co-located region 500, which is a region encompassing 16×16 pixels in the candidate reference picture. In some examples, video encoder 20 and video decoder 30 may evaluate a center-right (CR) block within co-located region 500, illustrated by Pos. A in FIG. 5, to determine whether the CR block is inter-predicted with a disparity motion vector. The CR block is the block whose top-left corner is at the center of the co-located region and extends towards the right and bottom of the center of the co-located region, as illustrated by the block at Pos. A in FIG. 5. In this example, the CR block is 4×4.

If, after evaluating the CR block, video encoder 20 and video decoder 30 determine that the CR block is not inter-predicted with a disparity motion vector, video encoder 20 and video decoder 30 may evaluate another block within the candidate reference picture. For example, video encoder 20 and video decoder 30 may evaluate the bottom-right (BR) block of co-located region 500, illustrated by Pos. B in FIG. 5. The BR block is the block whose top-left corner is at the bottom-right corner of the co-located region and extends further from the right of the co-located region and further from the bottom of the co-located region.

Accordingly, there may be two blocks within each of two candidate reference pictures that video encoder 20 and video decoder 30 evaluate to determine whether a block within these candidate reference pictures are inter-predicted with a disparity motion vector. As soon as video encoder 20 and video decoder 30 determine that a block in a candidate reference picture is inter-predicted with a disparity motion vector, video encoder 20 and video decoder 30 may cease the evaluation of blocks and derive the disparity vector for the current block based on the disparity motion vector.

As described above, the first candidate reference picture that video encoder 20 and video decoder 30 evaluate may be the co-located picture. The second candidate reference picture that video encoder 20 and video decoder 30 evaluate may be one of a random access picture or a reference picture with the smallest different in POC values relative to the current picture and with the smallest temporal identification value. In some examples, video encoder 20 and video decoder 30 may first evaluate the CR block in the first candidate reference picture, and if the CR block is not inter-predicted with a disparity motion vector, video encoder 20 and video decoder 30 may next evaluate the BR block in the first candidate reference picture.

If the BR block in the first candidate reference picture is not inter-predicted with a disparity motion vector, video encoder 20 and video decoder 30 may evaluate the BR block in the second candidate reference picture. If the BR block in the second candidate reference picture is not inter-predicted with a disparity motion vector, video encoder 20 and video decoder 30 may next evaluate the CR block in the second candidate reference picture.

If the blocks in both of the candidate reference pictures are not inter-predicted with a disparity motion vector, video encoder 20 and video decoder 30 may evaluate the IDV. For example, video encoder 20 and video decoder 30 may evaluate spatial neighboring blocks, such as those illustrated in FIG. 4, in the following order: block 406, block 405, block 402, block 403, and block 404. If video encoder 20 and video decoder 30 had derived a disparity vector for any of these blocks, and these blocks were inter-predicted in the skip/merge mode, then video encoder 20 and video decoder 30 may derive the disparity vector for the current block from the derived disparity vector for one of these spatial neighboring blocks.

In the above example, video encoder 20 and video decoder 30 may evaluate the BR block of a candidate reference picture (e.g., as the first block that is evaluated or if the CR block is not inter-predicted with a disparity motion vector). However, in certain circumstances, there may be some drawbacks with evaluating the BR block in a candidate reference picture. For instance, there may be an increase in complexity and decrease in memory bandwidth efficiency in evaluating the BR block in certain circumstances.

Also, the CR block and the BR block being the blocks that video encoder 20 and video decoder 30 evaluate is provided for purposes of illustration only and should not be considered limiting. In general, it may be possible to utilize any block within the candidate reference pictures as the block whose motion information video encoder 20 and video decoder 30 evaluate to determine if the block is inter-predicted with a disparity motion vector. As described in more detail, in general, for certain blocks within the candidate reference picture, there may be an increase in complexity and decrease in memory bandwidth efficiency in determine whether the blocks are inter-predicted with disparity motion vectors.

For video encoder 20 and video decoder 30 to evaluate motion information for blocks in candidate reference pictures (e.g., determine whether blocks in candidate reference picture are inter-predicted with a disparity motion vector) means that video encoder 20 and video decoder 30 previously encoded or decoded the candidate reference picture. In addition, video encoder 20 and video decoder 30 stored the motion information of the blocks within the candidate reference picture within memory, such as a decoded picture buffer (DPB) or some other memory storage component.

In some examples, video encoder 20 and video decoder 30 may store motion information of blocks of the candidate reference pictures based on a largest coding unit (LCU). For example, a coding unit (CU) may include one or more prediction units (PUs), which is one example of a video block that is to be inter-predicted, and one LCU may include one or more CUs.

Accordingly, with a single call to memory (e.g., the DPB or some other memory storage component), video encoder 20 and video decoder 30 may be able to retrieve motion information for blocks within one or more consecutive LCUs within one LCU row. For instance, one row within the memory may store motion information for one row of LCUs, and video encoder 20 and video decoder 30 may be able to retrieve motion information for a row of LCUs with a single call to the memory.

If a block of the candidate reference picture resides outside an LCU, video encoder 20 and video decoder 30 may require an additional memory call to retrieve the motion information for such a block. Such an additional memory call may slow down the video processing, as well as negatively impact the memory bandwidth, resulting in a more complex video encoding and video decoding system.

In accordance with the techniques described in this disclosure, video encoder 20 and video decoder 30 may determine whether to evaluate the motion information of a block of a candidate reference picture to determine if the block is inter-predicted with a disparity motion vector based on the relative location of the block to an LCU. For instance, based on the location of the block relative to an LCU, video encoder 20 and video decoder 30 may determine whether the block is available or unavailable. Accordingly, the techniques place constraints on which blocks video encoder 20 and video decoder 30 evaluate for deriving the disparity vector based on the neighboring block disparity vector (NBDV) techniques in HEVC based multiview/3DV coding.

If video encoder 20 and video decoder 30 determine that the block is unavailable, video encoder 20 and video decoder 30 may not evaluate the motion vector information of the block to determine if the block is inter-predicted with a disparity motion vector. If video encoder 20 and video decoder 30 determine that the block is available, video encoder 20 and video decoder 30 may evaluate the motion vector information of the block to determine if the block is inter-predicted with a disparity motion vector.

In some examples, if the block is unavailable, video encoder 20 and video decoder 30 may evaluate the motion information of some other block that is available to determine if such a block is inter-predicted with a disparity motion vector. In other words, when a temporal neighboring block is unavailable, it is replaced by another available temporal neighboring block. However, substituting an available block for a block determined to be unavailable is not required in every example, and is provided for purposes of illustration only.

In the techniques described in this disclosure, an LCU in the current picture may encompass the current block in the current picture (i.e., the block is to be inter-prediction encoded or inter-prediction decoded). In accordance with the techniques described in this disclosure, video encoder 20 and video decoder 30 may determine a co-located LCU (CLCU) in the candidate reference picture that is co-located with the LCU of the current picture. For example, the CLCU encompasses the same area in the candidate reference picture that the LCU, which includes the current block, encompasses in the current picture. In other words, the position of the CLCU in the candidate reference picture is the same as the position of the LCU in the current picture.

In some examples, if the block of the candidate reference picture whose motion information video encoder 20 and video decoder 30 are to evaluate is within the CLCU in the candidate reference picture, then video encoder 20 and video decoder 30 may be able to retrieve the motion information for the block from the memory with a single call. For instance, in FIG. 5, the blocks in the candidate reference picture whose motion information video encoder 20 and video decoder 30 are to evaluate are the blocks at Pos. A and Pos. B. In this example, if the block at Pos. A and the block at Pos. B are both within the CLCU, then video encoder 20 and video decoder 30 may be able to retrieve the motion information for the block at Pos. A and the block at Pos. B with one single memory call (i.e., one single access to the memory).

If, however, the block at Pos. A is within the CLCU, but the block at Pos. B is not within the CLCU, then video encoder 20 and video decoder 30 may not be able to retrieve the motion information for the block at Pos. A and the block at Pos. B with one single memory call. Instead, video encoder 20 and video decoder 30 would need to access the memory a first time to retrieve the motion information for the block at Pos. A, and determine if the block at Pos. A is inter-predicted with a disparity motion vector. If the block at Pos. A is not inter-predicted with a disparity motion vector, video encoder 20 and video decoder 30 would need to access the memory a second time to retrieve the motion information for the block at Pos. B to determine if the block at Pos. B is inter-predicted with a disparity motion vector. Video encoder 20 and video decoder 30 would similarly need two memory access if video encoder 20 and video decoder 30 had to first access the motion information for the block at Pos. B, and then access the motion information for the block at Pos. A, if the block at Pos. B was not inter-predicted with a disparity motion vector.

In the techniques described in this disclosure, video encoder 20 and video decoder 30 may determine whether to evaluate the motion information of a block in the candidate reference picture based on the location of the block in the candidate reference picture to the CLCU. For instance, based on the location of the block in the candidate reference picture to the CLCU, video encoder 20 and video decoder 30 may determine whether the block is available or unavailable, and only if available, would video encoder 20 and video decoder 30 evaluate the motion information.

Figure 6:
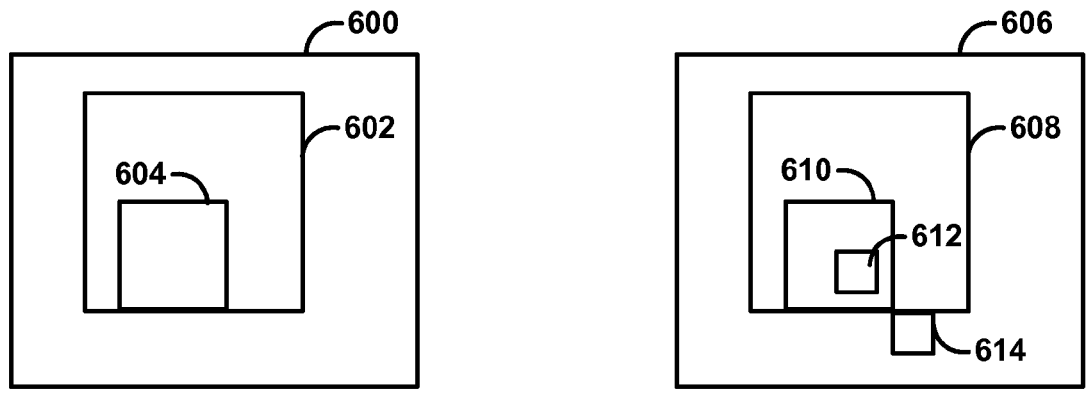
FIG. 6 is a conceptual diagram illustrating one example location of a block relative to a co-located largest coding unit (CLCU).

FIG. 6 is a conceptual diagram illustrating one example location of a block relative to a co-located largest coding unit (CLCU). FIG. 6 illustrates current picture 600. Current picture 600 includes current block 604. As illustrated, current block 604 may be encompassed by LCU 602. In accordance with the techniques described in this disclosure, video encoder 20 and video decoder 30 may identify candidate reference picture 606. Examples of candidate reference pictures are described above.

Within candidate reference picture 606, video encoder 20 and video decoder 30 may determine CLCU 608. For instance, as illustrated, CLCU 608 encompasses the same relative area within candidate reference picture 606 and is in the same position as LCU 602 in current picture 600. In some examples, any block that is outside a bottom boundary of CLCU 608 may be unavailable.

In the example of FIG. 6, block 614 may be unavailable because block 614, relative to the location of 610, is outside the bottom boundary of CLCU 608. In this example, video encoder 20 and video decoder 30 may not evaluate motion information for block 614 to determine if block 614 is inter-predicted with a disparity motion vector. For example, as illustrated, co-located region 610 of candidate reference picture 606 may be co-located with current block 604. In this example, block 612 within co-located region 610 is the center-right (CR) block and block 614 is the bottom-right (BR) block.

In accordance with one or more example techniques described in this disclosure, if candidate reference picture 606 is the first candidate reference picture, video encoder 20 and video decoder 30 may evaluate the motion information for block 612 to determine if block 612 is inter-predicted with a disparity motion vector. Even if block 612 is not inter-predicted with a disparity motion vector, video encoder 20 and video decoder 30 may not evaluate the motion information for block 614 because video encoder 20 and video decoder 30 may determine that block 614 is unavailable since block 614 is outside the bottom boundary of CLCU 608. If candidate reference picture 606 is the second candidate reference picture, video encoder 20 and video decoder 30 may not evaluate the motion information for block 614 because video encoder 20 and video decoder 30 may determine that block 614 is unavailable since block 614 is outside the bottom boundary of CLCU 608. Rather, video encoder 20 and video decoder 30 may directly evaluate the motion information for block 612 to determine if block 612 is inter-predicted with a disparity motion vector.

In some examples, the reason video encoder 20 and video decoder 30 may determine that block 614 is unavailable may be because retrieving the motion information for block 614 may require an additional memory access which may waste processing time. In some examples, if video encoder 20 and video decoder 30 determine that a block that is to be evaluated is unavailable, video encoder 20 and video decoder 30 may substitute another block for the block determined to be unavailable. As one example, video encoder 20 and video decoder 30 may substitute a block within the CLCU for the block determined to be unavailable.

In FIG. 6, video encoder 20 and video decoder 30 determined that block 614 was unavailable based on the location of block 614 relative to CLCU 608 (e.g., the bottom-right block 614 of the co-located region 610 is outside a bottom boundary of CLCU 608). There may be other criteria that video encoder 20 and video decoder 30 use to determine whether a block is available or unavailable.

As one example, video encoder 20 and video decoder 30 may determine that a block is unavailable if the block is outside the bottom boundary of the CLCU or outside a right boundary of the candidate reference picture. As another example, video encoder 20 and video decoder 30 may determine that any block in the candidate reference picture that is outside the bottom boundary of the CLCU or outside the top boundary of the CLCU is unavailable. An another example, video encoder 20 and video decoder 30 may determine that any block in the candidate reference picture that is outside the rows between the bottom boundary and top boundary of the CLCU is unavailable. As another example, video encoder 20 and video decoder 30 may determine that any block in the candidate reference picture that is outside the bottom boundary or the top boundary of the CLCU, or outside the right or left boundary of the candidate reference picture is unavailable.

In some examples, video encoder 20 and video decoder 30 may determine that a block in the candidate reference picture is available only if the block is within the CLCU. In some examples, video encoder 20 and video decoder 30 may determine that block in the candidate reference picture is available only if the block is within the CLCU or to the right of the CLCU. In some examples, if video encoder 20 and video decoder 30 determine that a block that is to be evaluated is unavailable (e.g., for being outside the bottom boundary of the CLCU, video encoder 20 and video decoder 30 may evaluate motion information of an available block, such as a block within the CLCU or a block to the right of the CLCU.

Figure 7:
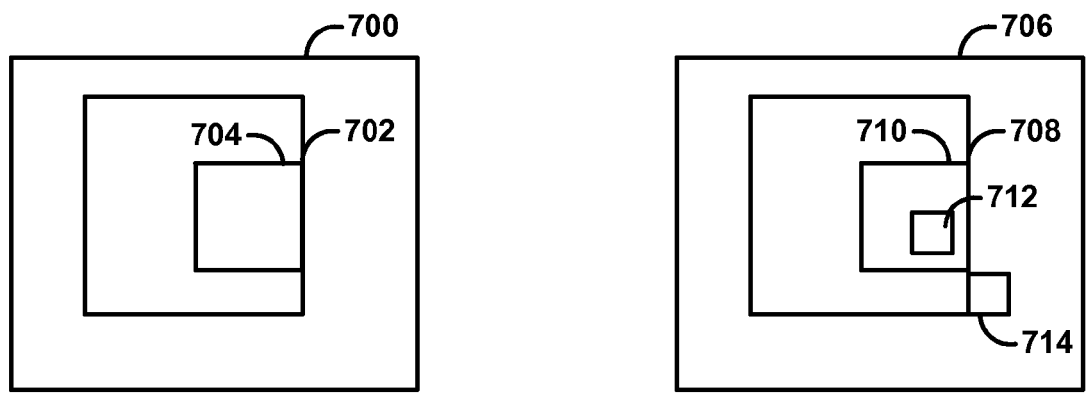
FIG. 7 is a conceptual diagram illustrating another example location of a block relative to a CLCU.

FIG. 7 is a conceptual diagram illustrating another example location of a block relative to a co-located largest coding unit (CLCU). Similar to FIG. 6, FIG. 7 illustrates current picture 700 that includes LCU 702, and LCU 702 includes current block 704. FIG. 7 also illustrates candidate reference picture 706 that includes CLCU 708, and CLCU 708 includes co-located region 710. Co-located region 710 includes CR block 712, and the block to the bottom-right of co-located region 710 is BR block 714.

In FIG. 7, BR block 714 is outside CLCU 710. However, BR block 714 is above the bottom boundary of CLCU 710, but outside the right boundary of CLCU 710. In some examples, although block 714 is outside CLCU 710, video encoder 20 and video decoder 30 may determine that block 714 is available because block 714 is to the right of CLCU 710 and above the bottom boundary of CLCU 710. As described above, in some examples, video encoder 20 and video decoder 30 may be able to retrieve motion information for blocks stored in the same row in the memory in a single memory call. Accordingly, although block 714 is external to CLCU 710, video encoder 20 and video decoder 30 may not need additional accesses to the memory to retrieve the motion information for block 714 and therefore may not consider block 714 to be unavailable.

In this manner, video encoder 20 and video decoder 30 may determine whether to evaluate the motion information of a block in a candidate reference picture to determine if the block in the candidate reference picture is inter-predicted with a disparity motion vector. By reducing the blocks whose motion information is evaluated, the techniques described in this disclosure may provide for faster video processing by reducing the number of access to memory for the motion information of blocks within the candidate reference picture.

As described above, in some examples, video encoder 20 and video decoder 30 may utilize the determined disparity vector for the current block of inter-view residual prediction. In video coding, video encoder 20 signals the difference (i.e., residual) between the current block and the block that is to be used for inter-prediction. Video decoder 30 utilizes the residual to reconstruct the current block from the block used for inter-prediction. In some examples, it may be possible to further reduce the amount of residual information that needs to be signaled. For example, video encoder 20 may further subtract the residual values of the block referred to by the determined disparity vector from the difference between the current block and the block that is used for inter-prediction. This additional subtraction may reduce the amount of residual information that video encoder 20 needs to signal.

For example, video decoder 30 may determine the residual of the current block, which is difference in the pixel values of the current block and the block used for inter-prediction based on the block referred to by the disparity vector of the current block (i.e., via inter-view residual prediction). After video decoder 30 determines the residual for the current block, video decoder 30 may add the residual values to the pixel values of the block used to inter-predict the current block to determine the pixel values of the current block (i.e., inter-prediction decode the current block).

As also described above, in some examples, video encoder 20 and video decoder 30 may utilize the determined disparity vector for the current block for inter-view motion prediction. Inter-view motion prediction refers to identifying the block to which the determined disparity vector refers, and utilizing the motion information of the block to which the determine disparity vector refers as a predictor for predicting the motion information of the current block. For example, the motion vector or vectors of the block to which the determined disparity vector refers may be candidates for advanced motion vector prediction (AMVP) mode or merge/skip mode lists.

In merge/skip mode and AMVP mode, video encoder 20 and video decoder 30 each construct a list of candidate motion vector predictors. Video encoder 20 and video decoder 30 may implement substantially similar techniques to construct respective lists of candidate motion vector predictors such that the candidate motion vector predictors identified in the list are the same for both video encoder 20 and video decoder 30.

For example, in merge/skip mode and AMVP mode, video encoder 20 and video decoder 30 construct the list of candidate motion vector predictors based on motion information of neighboring blocks. In some examples, video encoder 20 and video decoder 30 may include the motion information of the block referred to by determined disparity vector as another candidate in the list of candidate motion vector predictors. If there is no motion vector for block referred to by the disparity vector, video encoder 20 and video decoder 30 may convert the disparity vector to a disparity motion vector and add the disparity motion vector the list of candidate motion vector predictors.

For both merge/skip mode or AMVP mode, video encoder 20 signals an index into the list of candidate motion vector predictors, and video decoder 30 receives the index. Video decoder 30 and video encoder 20 may each construct the same list of candidate motion vector predictors. Video decoder 30 then identifies the motion information (e.g., reference pictures and motion vector or vectors) from the signaled index into the list of candidate motion vector predictors, and determines the motion vector for the current block based on the identified motion information.

For example, in merge/skip mode, video decoder 30 receives an index into the list of candidate motion vector predictors and identifies motion information stored in the list of candidate motion vector predictors based on the signaled index. Video decoder 30 determines the reference index, the reference picture list associated with the reference index, and the motion vector from the identified motion information. Video decoder 30 then adopts the determined reference index, the reference picture list associated with the reference index, and the motion vector from the identified motion information as the motion information for the current block. In other words, the current block inherits the motion information of the block identified by the index into the list of candidate motion vector predictors.

In some examples, in merge/skip mode, if the block identified by the index into the list of candidate motion vector predictors refers to a temporally neighboring block, video decoder 30 may not adopt the reference index and reference picture list associated with the reference index. Video decoder 30 may utilize any known technique or any technique that is to be developed to determine the reference index into the reference picture list (e.g., select index zero into one or both of the reference picture lists).

In this way, video decoder 30 may determine the motion information for the current block in merge/skip mode. Again, the motion information for the block identified by the disparity vector may be one of the candidates in the list of candidate motion vector predictors that is identifiable by the index into the list of candidate motion vector predictors. In merge mode, video decoder 30 may also receive residual data between the current block and the block referred to by the determined motion information, and video decoder 30 may utilize the residual data to determine the pixel values of the current block. In skip mode, video decoder 30 may not receive residual data between the current block and the block referred to by the determined motion information. In this example, video decoder 30 may assume the residual data to be zero (i.e., set the pixel values of the current block to be equal to those of the block referred to by the determined motion information).

AMVP mode may be similar to merge/skip mode; however, in addition to receiving an index to the list of candidate motion vector predictors, video decoder 30 may also receive a reference index values for reference picture list(s) from video encoder 20 and motion vector difference(s). The motion vector difference may be the difference in the motion vector between the motion vector of the block identified by the index into the list of candidate motion vector predictors and the actual motion vector of the current block.

For example, video decoder 30 may determine the motion vector of the block identified by the index into the list of candidate motion vector predictors. Video decoder 30 may add or subtract the value of the motion vector of the block identified by the index into the list of candidate motion vector predictors with the signaled motion vector difference to determine the motion vector for the current block. In addition, video decoder 30 may determine the reference picture to which the determined motion vector refers based on the signaled information indicating the reference picture list and the signaled index into that reference picture list.

In this way, video decoder 30 may determine the motion information for the current block in AMVP mode. Similar to merge/skip mode, video encoder 20 and video decoder 30 may include the motion information for the block identified by the determined disparity vector of the current block as one of the candidates in the list of candidate motion vector predictors.

As described above, for merge/skip mode and AMVP mode, video encoder 20 and video decoder 30 construct a list of candidate motion vector predictors. The following describes example ways in which to construct a list of candidate motion vector predictors. As described in more detail, video encoder 20 and video decoder 30 may evaluate the motion information of spatially and temporally neighboring blocks. In some examples, if the motion information of a spatial neighboring block is used to determine the motion information for the current block, the motion information of the spatial neighboring block may be referred to as a spatial motion vector predictor (SMVP). If the motion information of a temporal neighboring block is used to determine the motion information for the current block, the motion information of the temporal neighboring block may be referred to as a temporal motion vector predictor (TMVP). In some examples, video encoder 20 and video decoder 30 may scale the motion vector information of the temporally neighboring block based on the POC value if the motion information of a temporal neighboring block is to be included in the list of candidate motion vector predictors.

The following provides some description regarding the way in which video encoder 20 and video decoder 30 may determine which temporal motion vector predictors to include in the list of candidate motion vector predictors. In some examples, video encoder and video decoder 30 may utilize similar, but not identical techniques, to identify the location of the CR block and the BR block, such as those illustrated in FIG. 5.

To get a Temporal Motion Vector Predictor (TMVP), video encoder 20 and video decoder 30 may first identify a co-located picture. If the current picture is a B slice, video encoder 20 may signal a collocated_from_l0_flag in a slice header to indicate which reference picture list the co-located picture is from (e.g., whether the co-located picture is from RefPicList0 or RefPicList1). Video decoder 30 may determine which reference picture the co-located picture is from based on the collocated_from_l0_flag signaled in the slice header.

After a reference picture list is identified, video encoder 20 may signal the collocated_ref_idx syntax element in slice header is to identify the picture in the identified reference picture list. Video decoder 30 may identify the picture in the identified reference picture list based on the collocated_ref_idx syntax element.

Video encoder 20 and video decoder 30 may identify a co-located prediction unit (PU) by checking the co-located picture. The co-located PU may be either the right-bottom PU of the co-located region (e.g., the BR block), or the so-called 'center 3' or CR block (i.e., the right-bottom PU of the center of the co-located region).

Suppose a luma location (xP, yP) specifies the top-left sample of the current luma prediction block relative to the top-left luma sample of the current picture and variables nPbW and nPbH specify the width and the height of the luma prediction block, respectively, the BR block and center 3 or CR block may be defined as follows:

right-bottom PU of the co-located region:

$xPRb = xP + nPbW$ $yPRb = yP + nPbH$

If (yP>>Log 2CtbSizeY) is equal to (yPRb>>Log 2Ctb-SizeY), and xPRb is less than pic_width_in_luma_samples, the following applies.
The co-located PU specifies the luma prediction block covering the modified location given by ((xPRb>>4)<<4, (yPRb>>4)<<4) inside the collocated picture specified by colPic.

Center 3:

$xPCtr = xP + (nPbW >> 1)$ $yPCtr = yP + (nPbH >> 1)$

The variable co-located PU specifies the luma prediction block covering the modified location given by ((xPCtr>>4)<<4, (yPCtr>>4)<<4) inside the colPic.

Although the above description describes the manner in which video encoder 20 and video decoder 30 determine the location of the CR and BR blocks in the co-located picture, video encoder 20 and video decoder 30 may utilize similar techniques to determine the location of the CR and BR blocks in the candidate reference picture. For determining the temporal motion vector predictors, in some cases, the BR block may always be located within or at the right side of the CLCU in the co-located picture. However, as described above, in some examples, the BR block may not be located within or to the right of the CLCU in the candidate reference picture. Accordingly, unlike techniques for determining the temporal motion vector predictors, in the design for neighboring block disparity vector (NBDV) techniques in HEVC based multiview/3DV coding, the access to the BR block located in the bottom part of the CLCU that covers the co-located region in the candidate reference picture increases the video processing complexity.

In some examples, when video encoder 20 and video decoder 30 identify motion vectors by the above process to generate a motion candidate for AMVP or merge mode, video encoder 20 and video decoder 30 may scale the motion vector based on the temporal location (reflected by POC values). In HEVC, the sequence parameter set (SPS)

includes a flag sps_temporal_mvp_enable_flag and the slice header includes a flag pic_temporal_mvp_enable_flag when sps_temporal_mvp_enable_flag is equal to 1. When both pic_temporal_mvp_enable_flag and temporal_id are equal to 0 for a particular picture, no motion vector from pictures before that particular picture in decoding order would be used as a temporal motion vector predictor in decoding of the particular picture or a picture after the particular picture in decoding order.

FIG. 8 is a block diagram illustrating an example video encoder 20 that may implement the techniques described in this disclosure. Video encoder 20 may perform intra-coding (i.e., intra-prediction encoding) and inter-coding (i.e., inter-prediction encoding) of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. For multiview video coding, inter-coding also relies on prediction across different views to reduce or remove redundancy in video within frames or pictures of a video sequence that are displayed at the same time. Intra-mode (I mode) may refer to any of several spatial based compression modes. Inter-modes, such as uni-directional prediction (P mode) or bi-prediction (B mode), may refer to any of several temporal or view-based compression modes.

In the example of FIG. 8, video encoder 20 includes a partitioning unit 35, prediction processing unit 41, reference picture memory 64, summer 50, transform processing unit 52, quantization unit 54, and entropy encoding unit 56. Prediction processing unit 41 includes motion and disparity estimation unit 42, motion and disparity compensation unit 44, and intra-prediction processing unit 46. Reference picture memory 64 is one example of a decoded picture buffer (DPB) of video encoder 20.

For video block reconstruction, video encoder 20 also includes inverse quantization unit 58, inverse transform processing unit 60, and summer 62. A deblocking filter (not shown in FIG. 8) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 8, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-coding modes or one of a plurality of inter-coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion and disparity estimation unit 42 and motion and disparity compensation unit 44 within prediction processing unit 41 perform inter-predictive coding and/or interview coding of the current video block relative to one or more predictive blocks in one or more reference pictures and/or reference views to provide temporal or view compression.

Motion and disparity estimation unit 42 may be configured to determine the inter-prediction mode and/or interview prediction mode for a video slice according to a predetermined pattern for a video sequence. The predetermined pattern may designate video slices in the sequence as P slices, or B slices. Motion and disparity estimation unit 42 and motion and disparity compensation unit 44 may be highly integrated, but are illustrated separately for conceptual purposes. Motion and disparity estimation, performed by motion and disparity estimation unit 42, is the process of generating motion vectors, which estimate motion for video blocks. A motion vector, for example, may indicate the displacement of a PU of a video block within a current video frame or picture relative to a predictive block within a reference picture. Disparity estimation, performed by motion and disparity estimation unit 42, is the process of generating disparity motion vectors, which may be used to predict a currently coded block from a block in a different view.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion and disparity estimation unit 42 may perform a motion search relative to the full pixel positions and fractional pixel positions and output a motion vector with fractional pixel precision.

Motion and disparity estimation unit 42 calculates a motion vector (for motion compensated prediction) and/or a disparity motion vector (for disparity compensated prediction) for a PU of a video block in an inter-coded or interview predicted slice by comparing the position of the PU to the position of a predictive block of a reference picture. The reference picture may be selected from a first reference picture list (RefPicList0) or a second reference picture list (RefPicList1), each of which identify one or more reference pictures stored in reference picture memory 64. Motion and disparity estimation unit 42 sends the calculated motion vector and/or disparity vector to entropy encoding unit 56 and motion and disparity compensation unit 44.

Motion compensation and/or disparity compensation, performed by motion and disparity compensation unit 44, may involve fetching or generating the predictive block based on the motion vector determined by motion estimation and/or disparity estimation, possibly performing interpolations to sub-pixel precision. Upon receiving the motion vector and/or disparity for the PU of the current video block, motion and disparity compensation unit 44 may locate the predictive block to which the motion vector and/or disparity vector points in one of the reference picture lists. Video encoder 20 forms a residual video block by subtracting pixel values of the predictive block from the pixel values of the current video block being coded, forming pixel difference values.

The pixel difference values form residual data for the block, and may include both luma and chroma difference components. Summer 50 represents the component or components that perform this subtraction operation. Motion and disparity compensation unit 44 may also generate syntax elements associated with the video blocks and the video slice for use by video decoder 30 in decoding the video blocks of the video slice.

For some blocks, prediction processing unit 41 may select an intra-prediction mode instead of an inter-prediction mode. Intra-prediction processing unit 46 may intra-predict a current block, as an alternative to the inter-prediction performed by motion and disparity estimation unit 42 and motion and disparity compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied by transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion and disparity compensation unit 44 may calculate a reference block by adding the residual block to a predictive block of one of the reference pictures within one of the reference picture lists. Motion and disparity compensation unit 44 may also apply one or more interpolation filters to the reconstructed residual block to calculate sub-integer pixel values for use in motion estimation. Summer 62 adds the reconstructed residual block to the motion compensated prediction block produced by motion and disparity compensation unit 44 to produce a reference block for storage in reference picture memory 64. The reference block may be used by motion and disparity estimation unit 42 and motion and disparity compensation unit 44 as a reference block to inter-predict a block in a subsequent video frame or picture.

In this manner, video encoder 20 represents an example of a video encoder configured to implement the example techniques described in this disclosure. In some examples, prediction processing unit 41 may be configured to implement the techniques described in this disclosure. In some examples, a component other than prediction processing unit 41 or a component in conjunction prediction processing unit 41 may implement the techniques described in this disclosure.

For example, video encoder 20 may be configured to determine a location of CLCU in a candidate reference picture. The CLCU may be co-located with the LCU that covers a current block in a current picture. Video encoder 20 may determine whether a block in the candidate reference picture is available based on a location of the block in the candidate reference picture relative to a location of the CLCU within the candidate reference picture.

If video encoder 20 determines that the block in the candidate reference picture is available, video encoder 20 may determine whether the block in the candidate reference picture is inter-predicted with a disparity motion vector. In the techniques described in this disclosure, the disparity motion vector refers to a reference picture used to inter-predict the block in the candidate reference picture and is in a view other than a view that includes the candidate reference picture. If video encoder 20 determines that the block in the candidate reference picture is inter-predicted with the disparity motion vector, video encoder 20 may derive a disparity vector for the current block from the disparity motion vector. Video encoder 20 may inter-prediction encode the current block based in part on the disparity vector (e.g., as part of inter-view residual prediction or inter-view motion prediction).

If video encoder 20 determines that the block in the candidate reference picture is unavailable, video encoder 20 may derive the disparity vector for the current block from a block other than the block in the candidate reference picture that video encoder 20 determined to be unavailable. In some examples, the block in the candidate reference picture may be a block that is to the bottom-right of a co-located region in the candidate reference picture, and where the co-located region in the candidate reference picture is co-located with the current block.

In some examples, video encoder 20 may determine that the block in the candidate reference picture is unavailable if the block in the candidate reference picture is outside a bottom boundary of the CLCU. In some examples, video encoder 20 may determine that the block in the candidate reference picture is unavailable if the block in the candidate reference picture is outside a bottom boundary of the CLCU or outside a right or left boundary of the candidate reference picture. In some examples, video encoder 20 may determine that the block in the candidate reference picture is unavailable if the block in the candidate reference picture is outside the bottom boundary of the CLCU or outside the right boundary for the candidate reference picture. In some examples, video encoder 20 may determine that any block that is outside a bottom boundary or a top boundary of the CLCU, or outside a boundary of the candidate reference picture is unavailable. In some examples, video encoder 20 may determine that the block in the candidate reference picture is available if the block is within the CLCU or if the block is located to the right of the CLCU.

Figure 9:
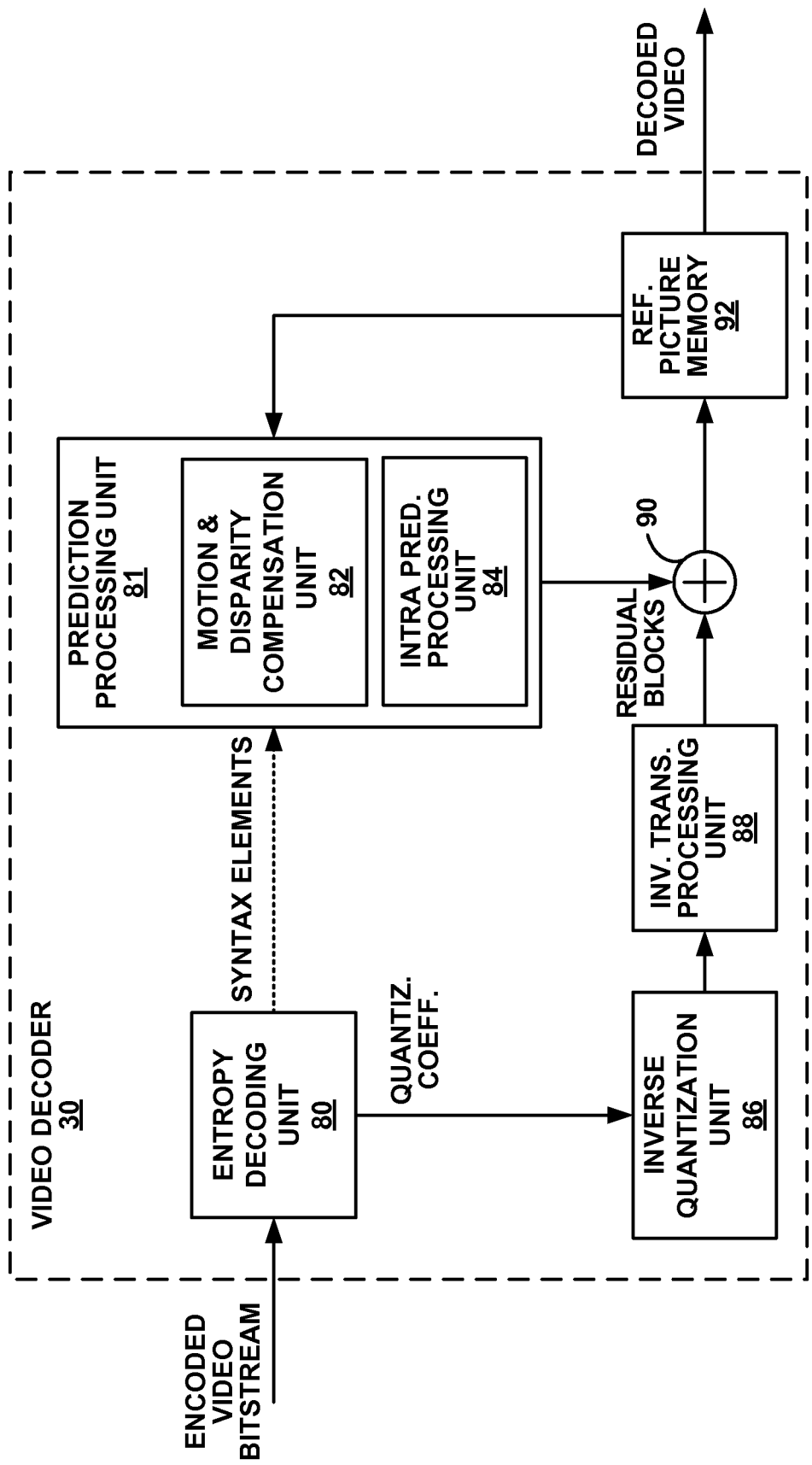
FIG. 9 is a block diagram illustrating an example video decoder that may implement the techniques described in this disclosure.

FIG. 9 is a block diagram illustrating an example video decoder 30 that may implement the techniques described in this disclosure. In the example of FIG. 9, video decoder 30 includes an entropy decoding unit 80, prediction processing unit 81, inverse quantization unit 86, inverse transform processing unit 88, summer 90, and reference picture memory 92. Reference picture memory 92 is one example of the decoded picture buffer (DPB) of video encoder 20.

Prediction processing unit 81 includes motion and disparity compensation unit 82 and intra-prediction processing unit 84. Video decoder 30 may, in some examples, perform a decoding pass generally reciprocal to the encoding pass described with respect to video encoder 20 from FIG. 8.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra-prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B or P) slice or interview predicted slice, motion and disparity compensation unit 82 of prediction processing unit 81 produces predictive blocks for a video block of the current video slice based on the temporal motion vectors, disparity motion vectors and other syntax elements received from entropy decoding unit 80. The predictive blocks may be produced from one of the reference pictures within one of the reference picture lists. Video decoder 30 may construct the reference frame lists, RefPicList0 and RefPicList1, using default construction techniques based on reference pictures stored in reference picture memory 92.

Motion and disparity compensation unit 82 determines prediction information for a video block of the current video slice by parsing the motion vectors and other syntax elements, and uses the prediction information to produce the predictive blocks for the current video block being decoded. For example, motion and disparity compensation unit 82 uses some of the received syntax elements to determine a prediction mode (e.g., intra- or inter-prediction) used to code the video blocks of the video slice, an inter-prediction or interview prediction slice type (e.g., B slice or P slice), construction information for one or more of the reference picture lists for the slice, motion vectors and/or disparity vectors for each inter-encoded video block of the slice, inter-prediction status for each inter-coded video block of the slice, and other information to decode the video blocks in the current video slice.

In some examples, motion and disparity compensation unit 82 may determine the signaled syntax elements indicating motion vectors using a motion vector prediction process. The motion vector prediction processes may include an AMVP mode and a merge mode. Motion and disparity compensation unit 82 may also perform interpolation based on interpolation filters. Motion and disparity compensation unit 82 may use interpolation filters as used by video encoder 20 during encoding of the video blocks to calculate interpolated values for sub-integer pixels of reference blocks. In this case, motion and disparity compensation unit 82 may determine the interpolation filters used by video encoder 20 from the received syntax elements and use the interpolation filters to produce predictive blocks.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion and disparity compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion and disparity compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

In this manner, video decoder 30 represents an example of a video decoder configured to implement the example techniques described in this disclosure. In some examples, prediction processing unit 81 may be configured to implement the techniques described in this disclosure. In some examples, a component other than prediction processing unit 81 or a component in conjunction prediction processing unit 81 may implement the techniques described in this disclosure.

For example, video decoder 30 may be configured to determine a location of CLCU in a candidate reference picture. The CLCU may be co-located with the LCU that covers a current block in a current picture. Video decoder 30 may determine whether a block in the candidate reference picture is available based on a location of the block in the candidate reference picture relative to a location of the CLCU within the candidate reference picture.

If video decoder 30 determines that the block in the candidate reference picture is available, video decoder 30 may determine whether the block in the candidate reference picture is inter-predicted with a disparity motion vector. In the techniques described in this disclosure, the disparity motion vector refers to a reference picture used to inter-predict the block in the candidate reference picture and is in a view other than a view that includes the candidate reference picture. If video decoder 30 determines that the block in the candidate reference picture is inter-predicted with the disparity motion vector, video decoder 30 may derive a disparity vector for the current block from the disparity motion vector. Video decoder 30 may inter-prediction decode the current block based in part on the disparity vector (e.g., as part of inter-view residual prediction or inter-view motion prediction).

If video decoder 30 determines that the block in the candidate reference picture is unavailable, video decoder 30 may derive the disparity vector for the current block from a block other than the block in the candidate reference picture that video decoder 30 determined to be unavailable. In some examples, the block in the candidate reference picture may be a block that is to the bottom-right of a co-located region in the candidate reference picture, and where the co-located region in the candidate reference picture is co-located with the current block.

In some examples, video decoder 30 may determine that the block in the candidate reference picture is unavailable if the block in the candidate reference picture is outside a bottom boundary of the CLCU. In some examples, video decoder 30 may determine that the block in the candidate reference picture is unavailable if the block in the candidate reference picture is outside the bottom boundary of the CLCU or outside the right boundary for the candidate reference picture. In some examples, video decoder 30 may determine that the block in the candidate reference picture is unavailable if the block in the candidate reference picture is outside a bottom boundary of the CLCU or outside a right or left boundary of the candidate reference picture. In some examples, video decoder 30 may determine that any block that is outside a bottom boundary or a top boundary of the CLCU, or outside a boundary of the candidate reference picture is unavailable. In some examples, video decoder 30 may determine that the block in the candidate reference picture is available if the block is within the CLCU or if the block is located to the right of the CLCU.

Figure 10:
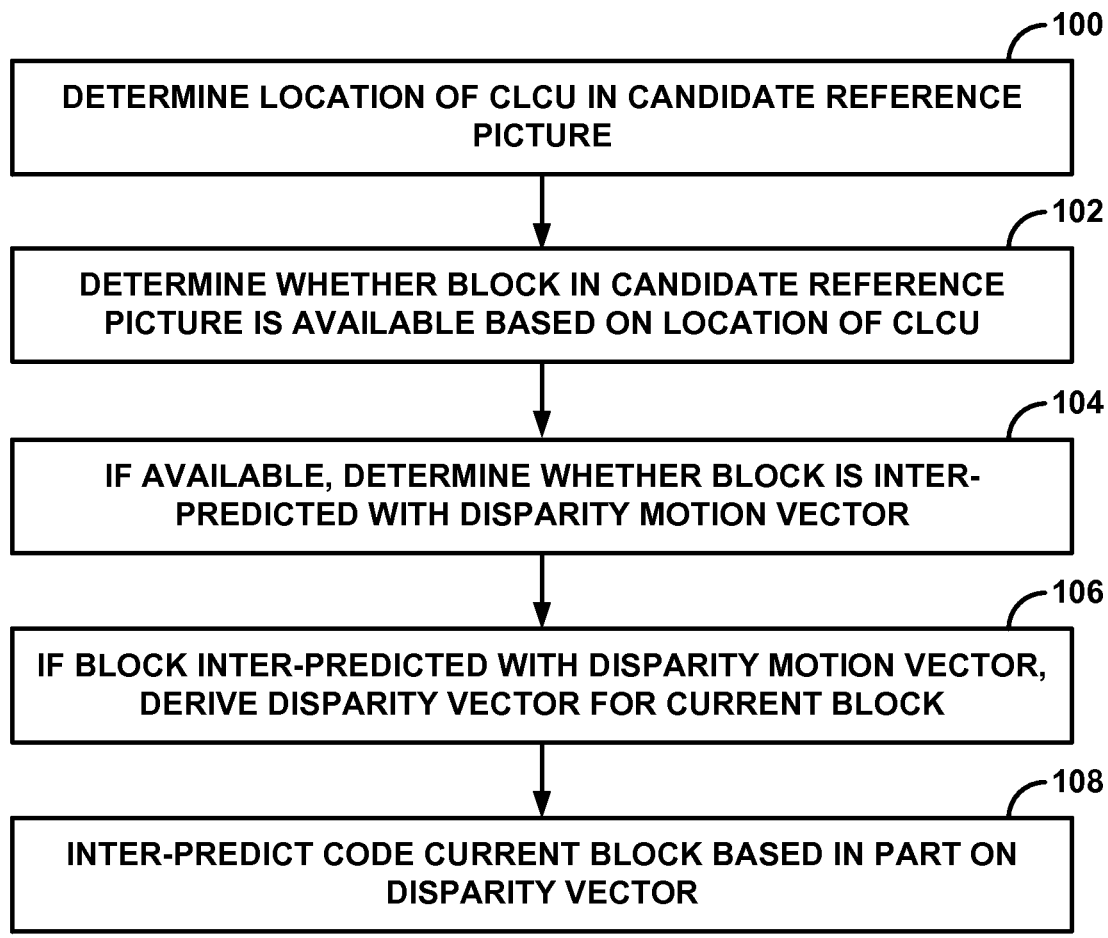
FIG. 10 is a flowchart illustrating an example operation in accordance with one or more example techniques described in this disclosure.

FIG. 10 is a flowchart illustrating an example operation in accordance with one or more example techniques described in this disclosure. The techniques described with respect to FIG. 10 may be implemented by video encoder 20 and/or video decoder 30. For ease of description, the term video coder is used to generically refer to video encoder 20 and video decoder 30. In these examples, the term code or coding may refer to encode or encoding, when being performed by video encoder 20, or may refer to decode or decoding, when being performed by video decoder 30. In the techniques described in this disclosure, the video coder may be comprised by a microprocessor or an integrated circuit (IC). In some examples, a wireless communication device may comprise the video coder.

The video coder may determine a location of a co-located largest coding unit (CLCU) in a candidate reference picture (100). For example, for encoding and decoding, the techniques may be directed to determining a location of a co-located largest coding unit (CLCU) in a candidate reference picture. The CLCU is co-located with a largest coding unit (LCU) that covers a current block in a current picture. The video coder may determine whether a block in the candidate reference picture is available based on a location of the block in the candidate reference picture relative to a location of the CLCU within the candidate reference picture (102). For instance, the techniques may be directed to determining whether a block in the candidate reference picture is available based on a location of the block in the candidate reference picture relative to a location of the CLCU within the candidate reference picture.

If the block in the candidate reference picture is available, the video coder may determine whether the block in the candidate reference picture is inter-predicted with a disparity motion vector (104). For instance, the techniques may be directed to determining whether the block in the candidate reference picture is inter-predicted with a disparity motion vector. In the techniques described in this disclosure, the disparity motion vector refers to a reference picture used to inter-predict the block in the candidate reference picture and is in a view other than a view that includes the candidate reference picture. If the block in the candidate reference picture is inter-predicted with the disparity motion vector, the video coder may derive a disparity vector for the current block from the disparity motion vector (106). For instance, the techniques may be directed to deriving a disparity vector for the current block from the disparity motion vector if the block in the candidate reference picture is inter-predicted with the disparity motion vector.

The video coder may inter-predict code the current block based in part on the disparity vector (i.e., code the current block using inter-prediction) (108). In examples where the video coder is video encoder 20, video encoder 20 may inter-predict encode the current block based on the disparity vector, and in examples where the video coder is video decoder 30, video decoder 30 may inter-predict decode the current block based on the disparity vector. For instance, video encoder 20 and video decoder 30 may inter-predict encode or inter-predict decode, respectively, the current block as part of inter-view residual prediction or inter-view motion prediction.

The following provides implementation examples to apply the techniques of constraining which blocks in the candidate reference picture is considered to be available. The techniques may be applicable to the bottom-right block, and are described with respect to the 3D-HEVC specification text. The modifications are bolded and italicized, and the deletions are in double brackets.

In one case, the temporal neighboring block, BR block, shall be within or at the right side of the LCU that covers co-located region of current PU. Inputs to this process are a luma location (xP, yP) specifying the top-left sample of the current luma prediction block relative to the top-left luma sample of the current picture, variables specifying the width and the height of the luma prediction block, nPbW and nPbH Outputs of this process are the disparity vector mvDisp, the availability flag availableFlag.

The luma location (xPRb, yPRb) specifying the position of the right bottom luma prediction block of the current luma prediction block and the flag availableRb specifying the availability of the right bottom luma prediction block are derived by the following ordered steps:

1. The vertical component of the position of the right bottom luma prediction block is derived as follows.

$yPRb=yP+nPbH$

2. The horizontal component of the position of the right bottom luma prediction block is derived as follows.

$xPRb=xP+nPbW$

3. If (yP>>Log 2CtbSizeY) is equal to (yPRb>>Log 2CtbSizeY), and xPRb is less than pic_width_in_luma_samples [[and yPRb is less than pic_height_in_luma_samples]], availableRb is set equal to 1. Otherwise, availableRb is set equal to 0.

In another case, when the temporal neighboring block is outside (at the bottom) of CLCU, its upper block is used as the temporal neighboring block.

Inputs to this Process are a luma location (xP, yP) specifying the top-left sample of the current luma prediction block relative to the top-left luma sample of the current picture, variables specifying the width and the height of the luma prediction block, nPbW and nPbH Outputs of this Process are the disparity vector mvDisp, the availability flag availableFlag.

The luma location (xPRb, yPRb) specifying the position of the right bottom luma prediction block of the current luma prediction block and the flag availableRb specifying the availability of the right bottom luma prediction block are derived by the following ordered steps:

1. The vertical component of the position of the right bottom luma prediction block is derived as follows.

$yPRb=yP+nPbH$

If (yP>>Log 2CtbSizeY) is unequal to (yPRb>>Log 2CtbSizeY), yPRb is set equal to (((yP>>Log 2CtbSizeY)<<Log 2CtbSizeY)+CtbSizeY−4).

2. The horizontal component of the position of the right bottom luma prediction block is derived as follows.

$xPRb=xP+nPbW$

3. If xPRb is less than pic_width_in_luma_samples, [[and yPRb is less than pic_height_in_luma_samples]], availableRb is set equal to 1. Otherwise, availableRb is set equal to 0.

Alternatively, the highlighted part may be replaced by if (yP>>Log 2CtbSizeY) is unequal to (yPRb>>Log 2CtbSizeY), yPRb is set equal to (yP+nPbH−1).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to a tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
    determining a location of a co-located largest coding unit (CLCU) in a candidate reference picture, wherein the CLCU is co-located with a largest coding unit (LCU) that covers a current block in a current picture of the video data;
    determining a location of a block in the candidate reference picture relative to a location of the CLCU within the candidate reference picture;
    determining whether the block in the candidate reference picture is available for purposes of determining a disparity vector for the current block based on whether the block in the candidate reference picture is determined to be located inside or outside a bottom boundary of the CLCU within the candidate reference picture, wherein the block in the candidate reference picture is determined to be unavailable for purposes of determining the disparity vector for the current block based on the block in the candidate reference picture being located outside the bottom boundary of the CLCU;
    determining whether the block in the candidate reference picture is inter-predicted with a disparity motion vector for purposes of determining the disparity vector for the current block only when the block in the candidate reference picture is inside the bottom boundary of the CLCU, wherein the disparity motion vector refers to a reference picture used to inter-predict the block in the candidate reference picture and is in a view other than a view that includes the candidate reference picture;
    based on the block in the candidate reference picture being inter-predicted with the disparity motion vector, deriving the disparity vector for the current block from the disparity motion vector; and
    inter-prediction decoding the current block based in part on the disparity vector.

2. The method of claim 1, wherein determining whether the block in the candidate reference picture is available comprises determining whether the block in the candidate reference picture is available for purposes of determining the disparity vector further based on whether the block in the candidate reference picture is outside a right boundary of the candidate reference picture, wherein the block in the candidate reference picture is unavailable for purposes of determining the disparity vector based on a determination that the block in the candidate reference picture is located outside the right boundary of the candidate reference picture.

3. The method of claim 1, wherein the block in the candidate reference picture comprises a block that is to the bottom-right of a co-located region in the candidate reference picture, and wherein the co-located region in the candidate reference picture is co-located with the current block.

4. The method of claim 1, wherein determining whether the block in the candidate reference picture is available comprises determining whether the block in the candidate reference picture is available for purposes of determining the disparity vector further based on whether the block in the candidate reference picture is outside a right or left boundary of the candidate reference picture, wherein the block in the candidate reference picture is unavailable for purposes of determining the disparity vector based on a determination that the block in the candidate reference picture is located outside the right or left boundary of the candidate reference picture.

5. The method of claim 1, wherein determining whether the block in the candidate reference picture is available comprises determining that the block in the candidate reference picture is available for purposes of determining the disparity vector based on a determination that the block is within the CLCU or based on a determination that the block is located to the right of the CLCU and above the bottom boundary of the candidate reference picture.

6. The method of claim 1, further comprising:
    based on a determination that the block in the candidate reference picture is unavailable, deriving the disparity vector for the current block from a block other than the block in the candidate reference picture determined to be unavailable.

7. A method for encoding video data, the method comprising:
    determining a location of a co-located largest coding unit (CLCU) in a candidate reference picture, wherein the CLCU is co-located with a largest coding unit (LCU) that covers a current block in a current picture of the video data;
    determining a location of a block in the candidate reference picture relative to a location of the CLCU within the candidate reference picture;
    determining whether the block in the candidate reference picture is available for purposes of determining a disparity vector for the current block based on whether the block in the candidate reference picture is determined to be located inside or outside a bottom boundary of the CLCU within the candidate reference picture, wherein the block in the candidate reference picture is determined to be unavailable for purposes of determining the disparity vector for the current block based on the block in the candidate reference picture being located outside the bottom boundary of the CLCU;
    determining whether the block in the candidate reference picture is inter-predicted with a disparity motion vector for purposes of determining the disparity vector for the current block only when the block in the candidate reference picture is inside the bottom boundary of the CLCU, wherein the disparity motion vector refers to a reference picture used to inter-predict the block in the candidate reference picture and is in a view other than a view that includes the candidate reference picture;
    based on the block in the candidate reference picture being inter-predicted with the disparity motion vector, deriving the disparity vector for the current block from the disparity motion vector; and
    inter-prediction encoding the current block based in part on the disparity vector.

8. The method of claim 7, wherein determining whether the block in the candidate reference picture is available comprises determining whether the block in the candidate reference picture is available for purposes of determining the disparity vector further based on whether the block in the candidate reference picture is outside a right boundary of the candidate reference picture, wherein the block in the candidate reference picture is unavailable for purposes of determining the disparity vector based on a determination that the block in the candidate reference picture is located outside the right boundary of the candidate reference picture.

9. The method of claim 7, wherein the block in the candidate reference picture comprises a block that is to the bottom-right of a co-located region in the candidate reference picture, and wherein the co-located region in the candidate reference picture is co-located with the current block.

10. The method of claim 7, wherein determining whether the block in the candidate reference picture is available comprises determining whether the block in the candidate reference picture is available for purposes of determining the disparity vector further based on whether the block in the candidate reference picture is outside a right or left boundary of the candidate reference picture, wherein the block in the candidate reference picture is unavailable for purposes of determining the disparity vector based on a determination that the block in the candidate reference picture is located outside the right or left boundary of the candidate reference picture.

11. The method of claim 7, wherein determining whether the block in the candidate reference picture is available comprises determining that the block in the candidate reference picture is available for purposes of determining the disparity vector based on a determination that the block is within the CLCU or based on a determination that the block is located to the right of the CLCU and above the bottom boundary of the candidate reference picture.

12. The method of claim 7, further comprising:
based on a determination that the block in the candidate reference picture is unavailable, deriving the disparity vector for the current block from a block other than the block in the candidate reference picture determined to be unavailable.

13. A device comprising:
a memory configured to store video data; and
a video coder, the video coder configured to:
determine a location of a co-located largest coding unit (CLCU) in a candidate reference picture of the video data, wherein the CLCU is co-located with a largest coding unit (LCU) that covers a current block in a current picture of the video data;
determine a location of a block in the candidate reference picture relative to a location of the CLCU within the candidate reference picture;
determine whether the block in the candidate reference picture is available for purposes of determining a disparity vector for the current block based on whether the block in the candidate reference picture is determined to be located inside or outside a bottom boundary of the CLCU within the candidate reference picture, wherein the block in the candidate reference picture is determined to be unavailable for purposes of determining the disparity vector for the current block based on the block in the candidate reference picture being located outside the bottom boundary of the CLCU;
determine whether the block in the candidate reference picture is inter-predicted with a disparity motion vector for purposes of determining the disparity vector for the current block only when the block in the candidate reference picture is inside the bottom boundary of the CLCU, wherein the disparity motion vector refers to a reference picture used to inter-predict the block in the candidate reference picture and is in a view other than a view that includes the candidate reference picture;
based on the block in the candidate reference picture being inter-predicted with the disparity motion vector, derive the disparity vector for the current block from the disparity motion vector; and
inter-prediction code the current block based in part on the disparity vector.

14. The device of claim 13, wherein, to determine whether the block in the candidate reference picture is available, the video coder is configured to determine whether the block in the candidate reference picture is available for purposes of determining the disparity vector further based on whether the block in the candidate reference picture is outside a bottom boundary of the CLCU or outside a right boundary of the candidate reference picture, wherein the block in the candidate reference picture is unavailable for purposes of determining the disparity vector based on a determination that the block in the candidate reference picture is located outside the right boundary of the candidate reference picture.

15. The device of claim 13, wherein the block in the candidate reference picture comprises a block that is to the bottom-right of a co-located region in the candidate reference picture, and wherein the co-located region in the candidate reference picture is co-located with the current block.

16. The device of claim 13, wherein the video coder is configured to further determine that the block in the candidate reference picture is unavailable based on the block in the candidate reference picture being outside a right or left boundary of the candidate reference picture.

17. The device of claim 13, wherein the video coder is configured to determine that the block in the candidate reference picture is available for purposes of determining the disparity vector based on a determination that the block is within the CLCU or based on a determination that the block is located to the right of the CLCU and above the bottom boundary of the candidate reference picture.

18. The device of claim 13, wherein, based on a determination that the block in the candidate reference picture is unavailable, the video coder is configured to derive the disparity vector for the current block from a block other than the block in the candidate reference picture determined to be unavailable.

19. The device of claim 13, wherein the video coder comprises a video decoder, and wherein the video decoder is configured to inter-prediction decode the current block based in part on the disparity vector.

20. The device of claim 13, wherein the video coder comprises a video encoder, and wherein the video encoder is configured to inter-prediction encode the current block based in part on the disparity vector.

21. The device of claim 13, wherein the device comprises one of:
an integrated circuit (IC);
a microprocessor; or
a wireless communication device comprising the video coder.

22. A device for coding video data, the device comprising:
means for determining a location of a co-located largest coding unit (CLCU) in a candidate reference picture, wherein the CLCU is co-located with a largest coding unit (LCU) that covers a current block in a current picture of the video data;
means for determining a location of a block in the candidate reference picture relative to a location of the CLCU within the candidate reference picture;
means for determining whether the block in the candidate reference picture is available for purposes of determining a disparity vector for the current block based on whether the block in the candidate reference picture is determined to be located inside or outside a bottom boundary of the CLCU within the candidate reference picture, wherein the block in the candidate reference picture is determined to be unavailable for purposes of determining the disparity vector for the current block based on the block in the candidate reference picture being located outside the bottom boundary of the CLCU;

means for determining whether the block in the candidate reference picture is inter-predicted with a disparity motion vector for purposes of determining the disparity vector for the current block only when the block in the candidate reference picture is inside the bottom boundary of the CLCU, wherein the disparity motion vector refers to a reference picture used to inter-predict the block in the candidate reference picture and is in a view other than a view that includes the candidate reference picture;

means for deriving the disparity vector for the current block from the disparity motion vector based on the block in the candidate reference picture being inter-predicted with the disparity motion vector; and means for inter-prediction coding the current block based in part on the disparity vector.

23. The device of claim 22, wherein the means for determining whether the block in the candidate reference picture is available comprises means for determining whether the block in the candidate reference picture is available for purposes of determining the disparity vector further based on whether the block in the candidate reference picture is outside a right boundary of the candidate reference picture, wherein the block in the candidate reference picture is unavailable for purposes of determining the disparity vector based on a determination that the block in the candidate reference picture is located outside the right boundary of the candidate reference picture.

24. The device of claim 22, further comprising:
means for deriving, based on a determination that the block in the candidate reference picture is unavailable, the disparity vector for the current block from a block other than the block in the candidate reference picture determined to be unavailable.

25. A non-transitory computer-readable storage medium having instructions stored thereon that when executed by one or more processors of a device for coding video data cause the one or more processors to:

determine a location of a co-located largest coding unit (CLCU) in a candidate reference picture, wherein the CLCU is co-located with a largest coding unit (LCU) that covers a current block in a current picture of the video data;

determine a location of a block in the candidate reference picture relative to a location of the CLCU within the candidate reference picture;

determine whether the block in the candidate reference picture is available for purposes of determining a disparity vector for the current block based on whether the block in the candidate reference picture is determined to be located inside or outside a bottom boundary of the CLCU within the candidate reference picture, wherein the block in the candidate reference picture is determined to be unavailable for purposes of determining the disparity vector for the current block based on the block in the candidate reference picture being located outside the bottom boundary of the CLCU;

determine whether the block in the candidate reference picture is inter-predicted with a disparity motion vector for purposes of determining the disparity vector for the current block only when the block in the candidate reference picture is inside the bottom boundary of the CLCU, wherein the disparity motion vector refers to a reference picture used to inter-predict the block in the candidate reference picture and is in a view other than a view that includes the candidate reference picture;

derive the disparity vector for the current block from the disparity motion vector based on the block in the candidate reference picture being inter-predicted with the disparity motion vector; and inter-prediction code the current block based in part on the disparity vector.

26. The non-transitory computer-readable storage medium of claim 25, wherein the instructions that cause the one or more processors to determine whether the block in the candidate reference picture is available comprise instructions that cause the one or more processors to determine whether the block in the candidate reference picture is available for purposes of determining the disparity vector further based on whether the block in the candidate reference picture is outside a right boundary of the candidate reference picture, wherein the block in the candidate reference picture is unavailable for purposes of determining the disparity vector based on a determination that the block in the candidate reference picture is located outside the right boundary of the candidate reference picture.

27. The non-transitory computer-readable storage medium of claim 25, further comprising instructions that cause the one or more processors to:

based on a determination that the block in the candidate reference picture is unavailable, derive the disparity vector for the current block from a block other than the block in the candidate reference picture determined to be unavailable.

* * * * *